US009520602B2

United States Patent
Venkataraman et al.

(10) Patent No.: US 9,520,602 B2
(45) Date of Patent: Dec. 13, 2016

(54) SOFC HOT BOX COMPONENTS

(71) Applicant: BLOOM ENERGY CORPORATION, Sunnyvale, CA (US)

(72) Inventors: Swaminathan Venkataraman, Cupertino, CA (US); Vlad Kalika, Dublin, CA (US); David Weingaertner, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 0 days.

(21) Appl. No.: 14/938,019

(22) Filed: Nov. 11, 2015

(65) Prior Publication Data

US 2016/0064748 A1    Mar. 3, 2016

Related U.S. Application Data

(60) Division of application No. 13/344,364, filed on Jan. 5, 2012, now Pat. No. 9,190,673, and a
(Continued)

(51) Int. Cl.
*H01M 8/2425* (2016.01)
*H01M 8/04* (2016.01)
(Continued)

(52) U.S. Cl.
CPC ........ *H01M 8/04022* (2013.01); *F28D 9/0018* (2013.01); *F28D 9/0025* (2013.01); *F28F 9/02* (2013.01); *H01M 2/00* (2013.01); *H01M 8/04* (2013.01); *H01M 8/04052* (2013.01); *H01M 8/04067* (2013.01); *H01M 8/04074* (2013.01); *H01M 8/04097* (2013.01); *H01M 8/04268* (2013.01); *H01M 8/06* (2013.01); *H01M 8/0618* (2013.01); *H01M 8/0662* (2013.01);
(Continued)

(58) Field of Classification Search
CPC ..................... H01M 8/04007; H01M 8/04074; H01M 8/04082; H01M 8/04298
See application file for complete search history.

(56) References Cited

U.S. PATENT DOCUMENTS 1,746,497 A    2/1930   Quensel et al.
3,453,087 A    7/1969   Herp, Jr. et al.
(Continued)

FOREIGN PATENT DOCUMENTS

EP    0398111 A1    11/1990
EP    0977294 B1    2/2000
(Continued)

OTHER PUBLICATIONS

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.
(Continued)

*Primary Examiner* — Barbara Gilliam
*Assistant Examiner* — Angela Martin
(74) *Attorney, Agent, or Firm* — The Marbury Law Group PLLC

(57) ABSTRACT

Various hot box fuel cell system components are provided, such as heat exchangers, steam generator and other components.

8 Claims, 27 Drawing Sheets

Related U.S. Application Data continuation-in-part of application No. 12/873,935, filed on Sep. 1, 2010, now Pat. No. 8,445,156.

(60) Provisional application No. 61/430,255, filed on Jan. 6, 2011.

(51) Int. Cl.
    *H01M 2/00*     (2006.01)
    *H01M 8/06*     (2016.01)
    *H01M 8/24*     (2016.01)
    *F28F 9/02*     (2006.01)
    *F28D 9/00*     (2006.01)
    *H01M 8/12*     (2016.01)

(52) U.S. Cl.
    CPC .............. *H01M 8/12* (2013.01); *H01M 8/24* (2013.01); *H01M 8/2425* (2013.01); *H01M 2008/1293* (2013.01); *H01M 2300/0074* (2013.01); *Y02E 60/50* (2013.01); *Y02E 60/521* (2013.01); *Y02E 60/525* (2013.01)

(56) References Cited

U.S. PATENT DOCUMENTS

| | | |
|---|---|---|
| 3,453,146 A | 7/1969 | Bawa et al. |
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,362 A | 1/1992 | Farooque |
| 5,084,363 A | 1/1992 | Reiser |
| 5,091,075 A | 2/1992 | O'Neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,660 A | 8/1994 | Fujisawa et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,527,631 A | 6/1996 | Singh et al. |
| 5,573,867 A | 11/1996 | Zafred et al. |
| 5,601,937 A | 2/1997 | Isenberg |
| 5,612,149 A | 3/1997 | Hartvigsen et al. |
| 5,641,585 A | 6/1997 | Lessing et al. |
| 5,686,196 A | 11/1997 | Singh et al. |
| 5,693,201 A | 12/1997 | Hsu et al. |
| 5,733,675 A | 3/1998 | Dederer et al. |
| 5,741,605 A | 4/1998 | Gillett et al. |
| 5,763,114 A | 6/1998 | Khandkar et al. |
| 5,955,039 A | 9/1999 | Dowdy |
| 6,013,385 A | 1/2000 | DuBose |
| 6,051,125 A | 4/2000 | Pham et al. |
| 6,106,964 A | 8/2000 | Voss et al. |
| 6,106,967 A | 8/2000 | Virkar et al. |
| 6,280,865 B1 | 8/2001 | Eisman et al. |
| 6,329,090 B1 | 12/2001 | McElroy et al. |
| 6,348,278 B1 | 2/2002 | Lapierre et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,436,562 B1 | 8/2002 | DuBose |
| 6,451,466 B1 | 9/2002 | Grasso et al. |
| 6,531,243 B2 | 3/2003 | Thom |
| 6,582,842 B1 | 6/2003 | King |
| 6,623,880 B1 | 9/2003 | Geisbrecht et al. |
| 6,655,150 B1 | 12/2003 | Asen et al. |
| 6,656,625 B1 | 12/2003 | Thompson et al. |
| 6,749,958 B2 | 6/2004 | Pastula et al. |
| 6,821,663 B2 | 11/2004 | McElroy |
| 6,880,628 B2 | 4/2005 | Yoshida et al. |
| 6,924,053 B2 | 8/2005 | McElroy |

(56) References Cited

U.S. PATENT DOCUMENTS

| | | |
|---|---|---|
| 7,067,208 B2 | 6/2006 | Gottmann et al. |
| 7,482,078 B2 | 1/2009 | Sridhar et al. |
| 7,705,490 B2 | 4/2010 | Srinivasan et al. |
| 7,713,649 B2 | 5/2010 | Hickey et al. |
| 7,878,280 B2 | 2/2011 | Sridhar et al. |
| 7,974,106 B2 | 7/2011 | Gurunathan et al. |
| 8,101,307 B2 | 1/2012 | McElroy et al. |
| 8,137,855 B2 | 3/2012 | Weingaertner et al. |
| 8,445,156 B2* | 5/2013 | Weingaertner .......... F28D 9/005 429/428 |
| 8,563,180 B2 | 10/2013 | Perry et al. |
| 8,877,399 B2 | 11/2014 | Weingaertner et al. |
| 8,968,943 B2 | 3/2015 | Perry et al. |
| 9,190,693 B2 | 11/2015 | Sridhar et al. |
| 2001/0049035 A1 | 12/2001 | Haltiner, Jr. et al. |
| 2002/0004154 A1 | 1/2002 | Pastula et al. |
| 2002/0015867 A1 | 2/2002 | Cargnelli et al. |
| 2002/0028362 A1 | 3/2002 | Prediger et al. |
| 2002/0058175 A1 | 5/2002 | Ruhl |
| 2002/0106544 A1 | 8/2002 | Noetzel et al. |
| 2002/0142208 A1 | 10/2002 | Keefer et al. |
| 2002/0192516 A1 | 12/2002 | Tajima |
| 2003/0021741 A1 | 1/2003 | Childress et al. |
| 2003/0031904 A1 | 2/2003 | Haltiner |
| 2003/0049502 A1 | 3/2003 | Dickman et al. |
| 2003/0157386 A1 | 8/2003 | Gottmann |
| 2003/0162067 A1 | 8/2003 | McElroy |
| 2003/0196893 A1 | 10/2003 | McElroy |
| 2003/0205641 A1 | 11/2003 | McElroy |
| 2003/0235725 A1 | 12/2003 | Haltiner et al. |
| 2004/0018144 A1 | 1/2004 | Briscoe |
| 2004/0089438 A1 | 5/2004 | Valensa et al. |
| 2004/0096713 A1 | 5/2004 | Ballantine et al. |
| 2004/0131912 A1 | 7/2004 | Keefer et al. |
| 2004/0142215 A1 | 7/2004 | Barbir et al. |
| 2004/0191597 A1 | 9/2004 | McElroy |
| 2004/0191598 A1 | 9/2004 | McElroy et al. |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2005/0048334 A1 | 3/2005 | Sridhar et al. |
| 2005/0048336 A1 | 3/2005 | Takebe et al. |
| 2005/0048338 A1 | 3/2005 | Kobayashi et al. |
| 2005/0053814 A1 | 3/2005 | Imamura et al. |
| 2005/0056412 A1 | 3/2005 | Reinke et al. |
| 2005/0106429 A1 | 5/2005 | Keefer |
| 2005/0164051 A1 | 7/2005 | Venkataraman et al. |
| 2005/0221137 A1 | 10/2005 | Bandhauer et al. |
| 2005/0249988 A1 | 11/2005 | Pearson |
| 2006/0083964 A1 | 4/2006 | Edlinger et al. |
| 2006/0115393 A1 | 6/2006 | Reinke et al. |
| 2006/0147771 A1 | 7/2006 | Russell et al. |
| 2006/0248799 A1 | 11/2006 | Bandhauer et al. |
| 2006/0251934 A1 | 11/2006 | Valensa et al. |
| 2006/0251939 A1 | 11/2006 | Bandhauer et al. |
| 2006/0251940 A1 | 11/2006 | Bandhauer et al. |
| 2006/0263657 A1 | 11/2006 | Kelly et al. |
| 2007/0017367 A1 | 1/2007 | McElroy et al. |
| 2007/0017368 A1 | 1/2007 | Levan et al. |
| 2007/0017369 A1 | 1/2007 | Levan et al. |
| 2007/0178338 A1 | 8/2007 | McElroy et al. |
| 2007/0196704 A1 | 8/2007 | Valensa |
| 2007/0243435 A1 | 10/2007 | Dutta |
| 2007/0269693 A1 | 11/2007 | Perry |
| 2008/0038600 A1 | 2/2008 | Valensa et al. |
| 2008/0038622 A1 | 2/2008 | Valensa et al. |
| 2008/0197190 A1 | 8/2008 | Fujita |
| 2009/0029204 A1 | 1/2009 | Venkataraman et al. |
| 2009/0029205 A1 | 1/2009 | Venkataraman et al. |
| 2009/0042068 A1 | 2/2009 | Weingaertner et al. |
| 2009/0053569 A1 | 2/2009 | Perry et al. |
| 2009/0056919 A1 | 3/2009 | Hoffman et al. |
| 2009/0208784 A1* | 8/2009 | Perry ................ H01M 8/04014 429/411 |
| 2010/0190083 A1 | 7/2010 | Valensa et al. |
| 2010/0239924 A1 | 9/2010 | McElroy et al. |
| 2011/0281185 A1 | 11/2011 | Sridhar et al. |
| 2013/0224618 A1* | 8/2013 | Weingaertner .......... F28D 9/005 429/435 |

FOREIGN PATENT DOCUMENTS

| | | |
|---|---|---|
| EP | 1501146 A2 | 1/2005 |
| EP | 1541952 A1 | 5/2005 |
| JP | H09503615 A | 4/1997 |
| JP | H10233223 A | 9/1998 |
| JP | 2002071861 A | 3/2002 |
| JP | 2003229151 A | 8/2003 |
| JP | 2004069293 A | 3/2004 |
| JP | 2004247290 | 9/2004 |
| JP | 2006046846 A | 2/2006 |
| JP | 2010534913 A | 11/2010 |
| TW | 497288 | 8/2002 |
| TW | I299220 | 7/2008 |
| TW | I303899 | 12/2008 |
| WO | WO94/18712 A1 | 8/1994 |
| WO | WO03/019707 A1 | 3/2003 |
| WO | WO2004/013258 A1 | 2/2004 |
| WO | WO2004/076017 A2 | 9/2004 |
| WO | WO2004/092756 A1 | 10/2004 |
| WO | WO2004/093214 A2 | 10/2004 |
| WO | WO2004/095618 A2 | 11/2004 |
| WO | WO2008/141410 A1 | 11/2008 |

OTHER PUBLICATIONS

Hamburger, R. O., et al., "LabView DSC Automates Fuel Cell Catalyst Research," Nov. 4, 2004, http://web.archive.org/web/20041104200039/http://bloomy.com/newsletters/fuelcellresearch.pdf.

Austin, "Cell and Stack Construction: Low-Temperature Cells," *Fuel Cells: A Review of Government-Sponsored Research, 1950-1964*, NASA SP-120, pp. 101-102, (1967).

"Low Cost, Compact Solid Oxide Fuel Cell Generator," (Technology Management Inc.).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

EP Application No. 12732414.3, Office Action issued Jul. 17, 2015.

Taiwan Application No. 101100717, Office Action issued Aug. 4, 2015.

"Type BPL Granular Carbon", Calgon Product Bulletin, Calgon Corporation, Activated Carbon Division, 2 pgs.

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. $5^{th}$ Edition. USDOE. Oct. 2000. 9-1-9-4; 9-12-9-14.

LeVan, M. Douglas et al., "Adsorption and Ion Exchange", Perry's Chemical Engineers' Handbook ($7^{th}$ Edition), 1997, 66 pgs.

(56) References Cited

OTHER PUBLICATIONS

LeVan, M. Douglas et al., "Fixed-Bed Adsorption of Gases: Effect of Velocity Variations on Transition Types", AIChE Journal, vol. 34, No. 6, Jun. 1988, pp. 996-1005.
Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.
Olivier, Marie-Georges et al., "Adsorption of Light Hyrdocarbons and Carbon Dioxide on Silica Gel", J. Chem. Eng. Data, 1997, vol. 42, pp. 230-233.
Qi, Nan et al., "Adsorption equilibrium modeling for water on activated carbons", Carbon, vol. 43, 2005, pp. 2258-2263.
Rudisill, Edgar N. et al., "Coadsorption of Hydrocarbons and Water on BPL Activated Carbon", Ind. Eng. Chem. Res., 1992, vol. 31, pp. 1122-1130.
Sward, Brian K. et al., "Simple Flow-Through Apparatus for Measurement of Mass Transfer Rates in Adsorbent Particles by Frequency Response", Fundementals of Adsorption, K. Kaneko et al., eds., vol. 7, 2002, pp. 29-36. Published by IK International of Japan.
Sward, Brian K. et al., "Frequency Response Method for Measuring Mass Transfer Rates in Adsorbents via Pressure Perturbation", Adsorption, vol. 9, 2003, pp. 37-54.
Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.
Yang, Ralph T., "Adsorbents: Fundamentals and Applications", 2003, 4 pgs.
Yong, Zou et al., "Adsorption of Carbon Dioxide on Basic Alumina at High Temperatures", J. Chem. Eng. Data, 2000, vol. 45, pp. 1093-1095.
Yong, Zou et al., "Adsorption of carbon dioxide at high temperature—a review", Separation and Purification Technology, vol. 26, 2002, pp. 195-205.
Supplemental European Search Report and European Search Opinion, EP Application No. 06800263, Oct. 16, 2009, 11pgs.
Notification of Reasons of Refusal issued in Japanese Patent Application No. 2008-524022, Jan. 24, 2012.
PCT/US2012/020356, International Search Report and Written Opinion, issued May 16, 2012.
PCT/US2010/047540, International Search Report and Written Opinion, issued May 30, 2011.
PCT/US2010/047540, International Preliminary Report on Patentability, issued Mar. 15, 2012.
Japanese Office Action, Notice of Reasons for Rejection for Japanese Application No. 2013-548546, dated Jan. 18, 2016, (5 pages).
Office Action in ROC (Taiwan) Pat. Appln. No. 101100717 dated Feb. 15, 2016, (6 pages).

\* cited by examiner

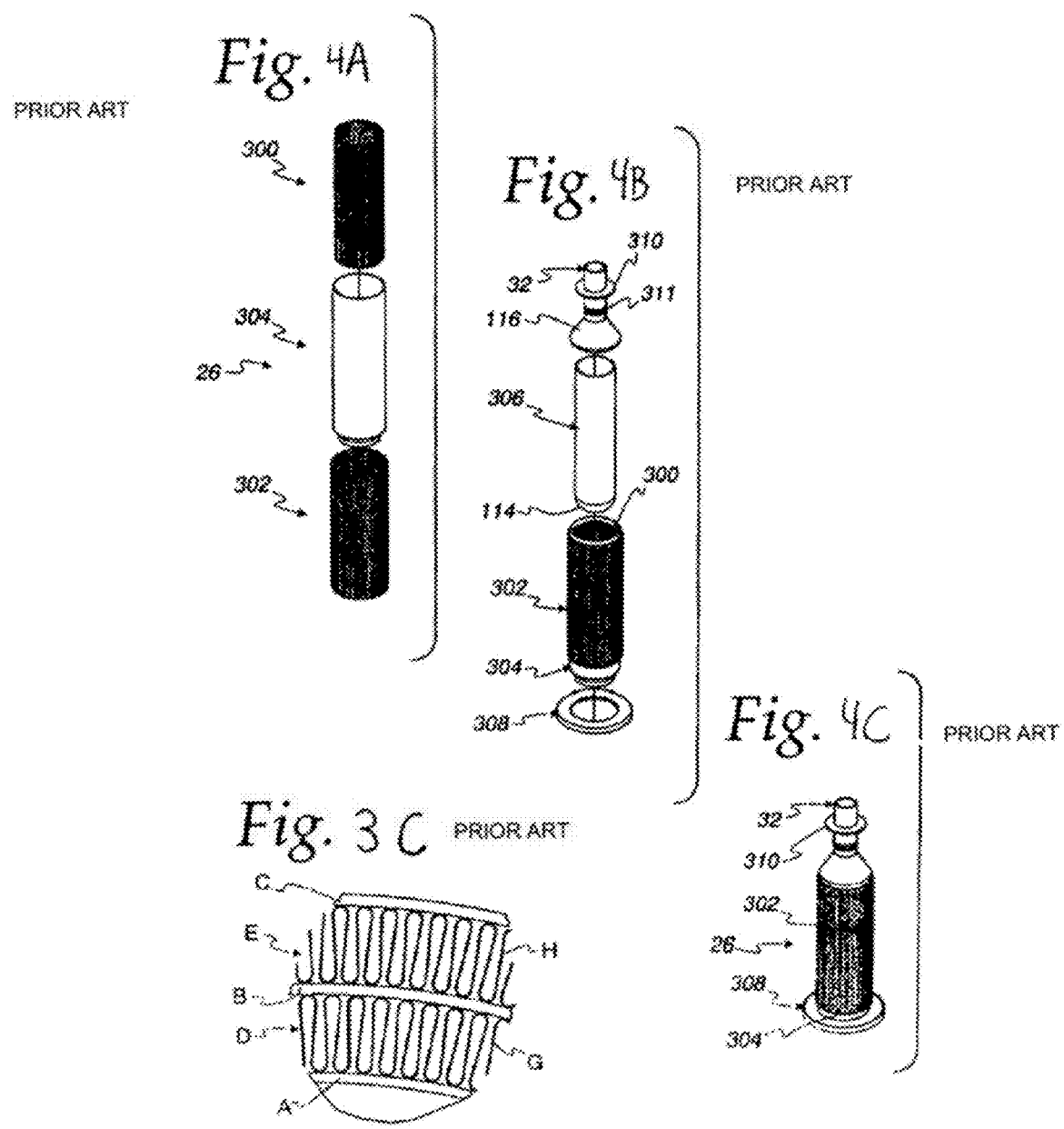

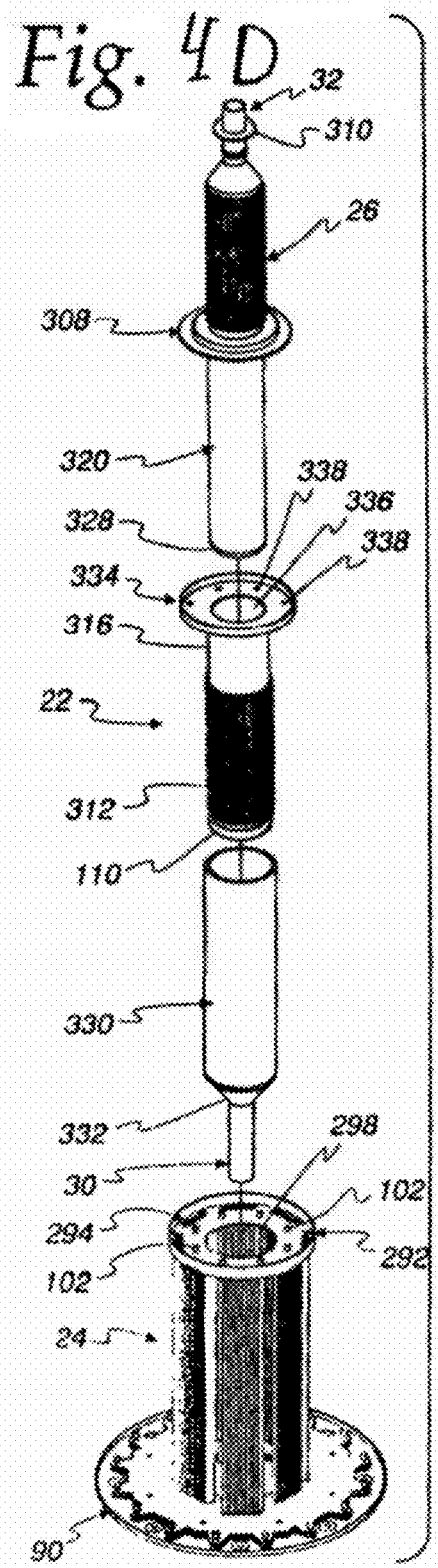

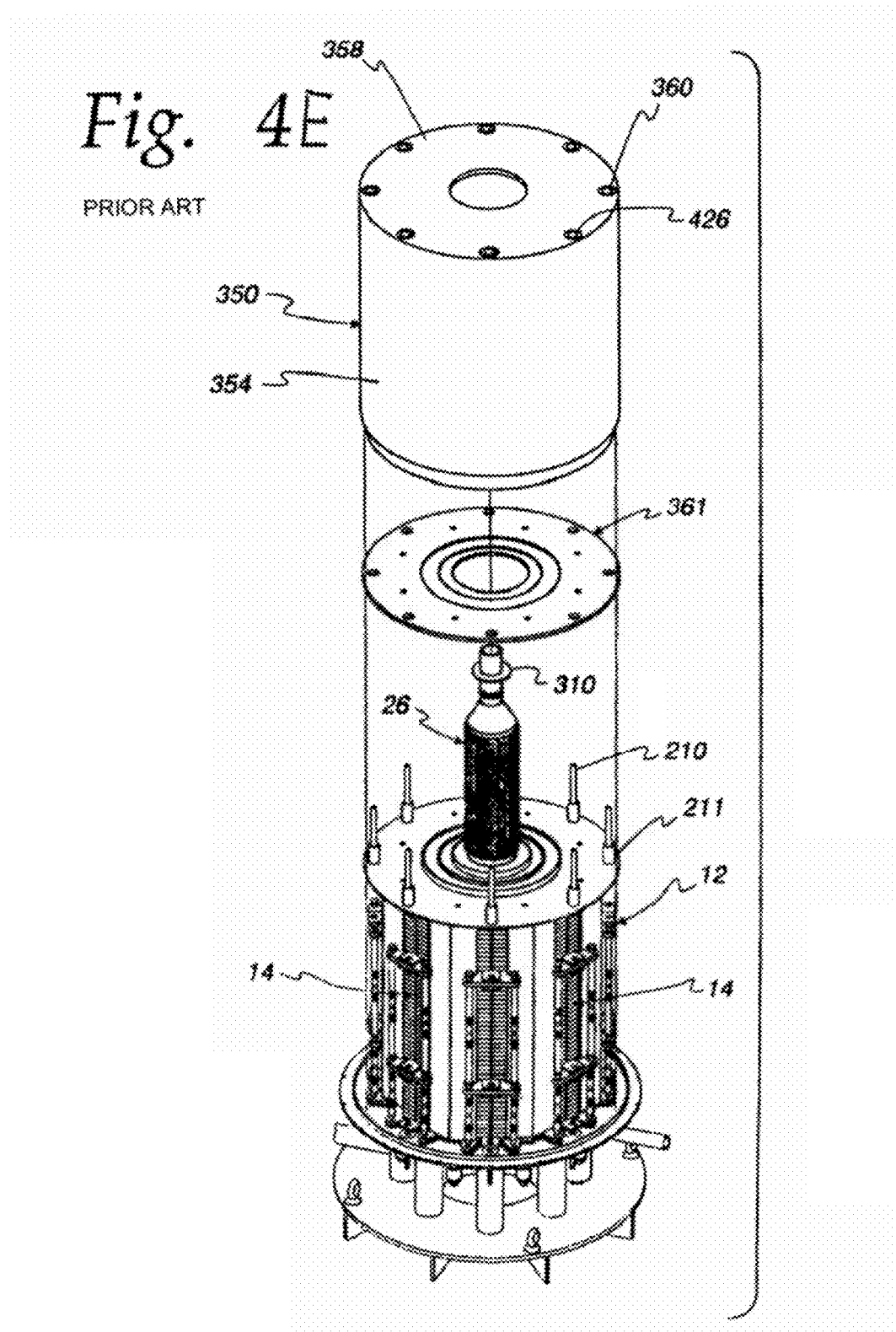

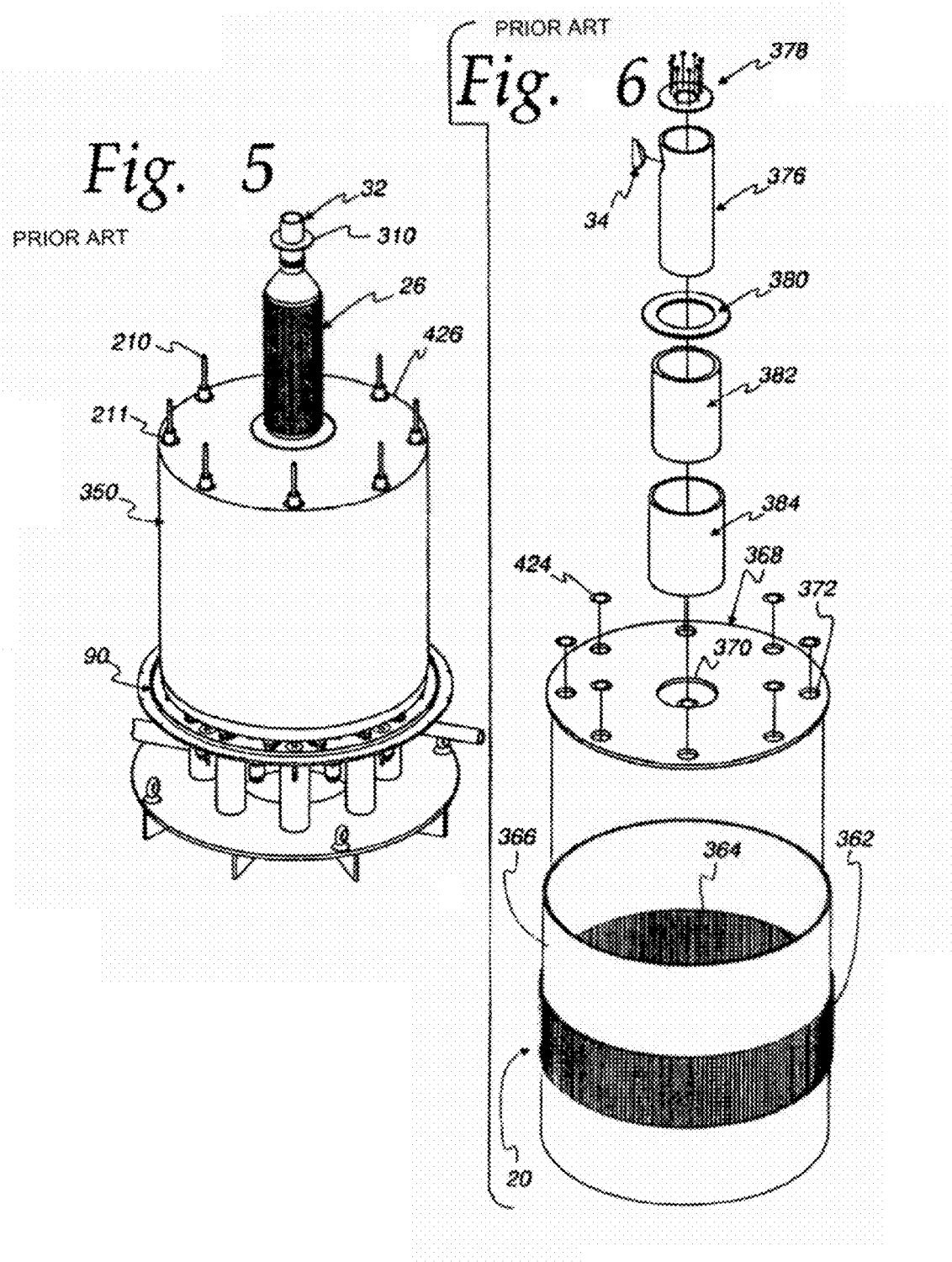

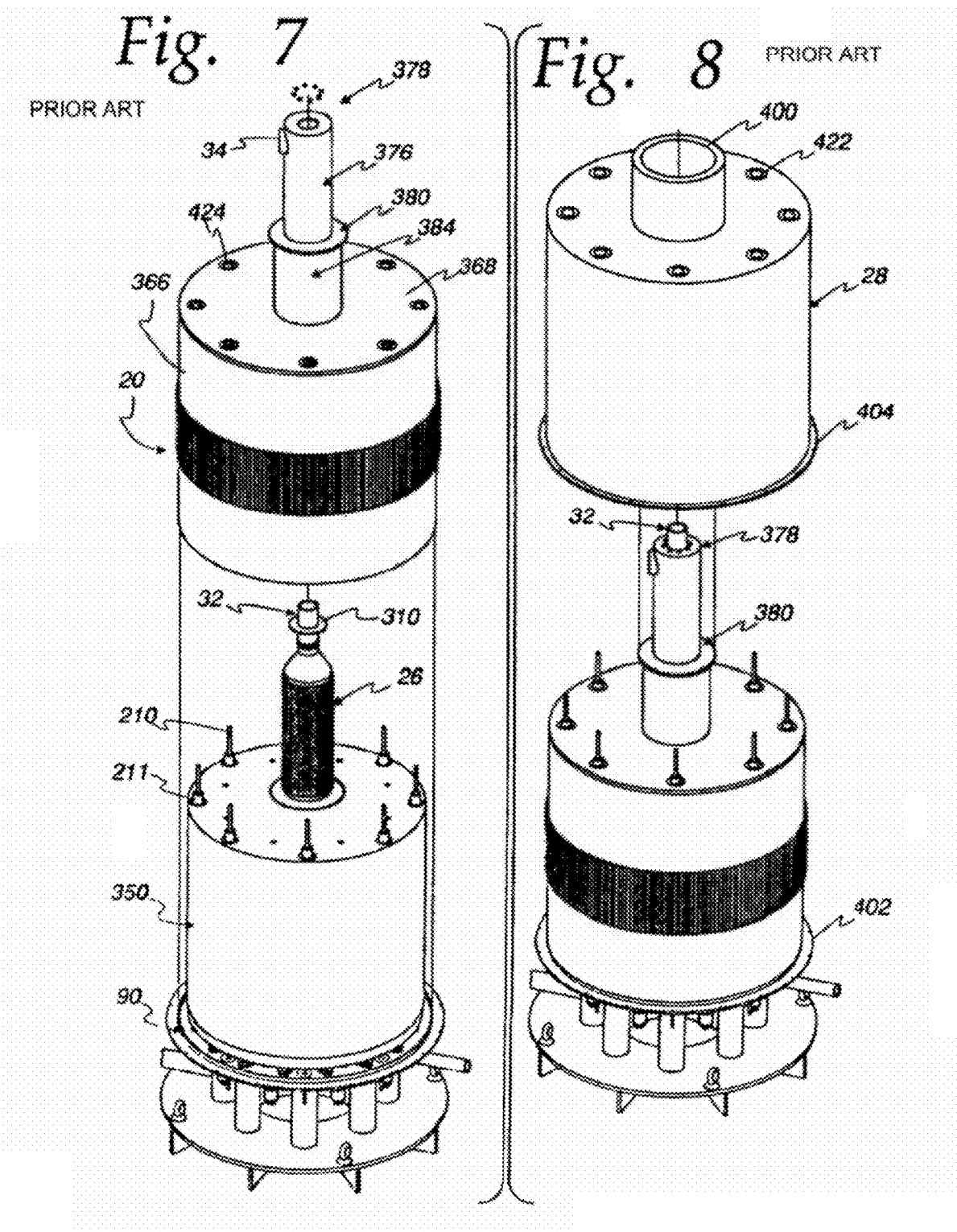

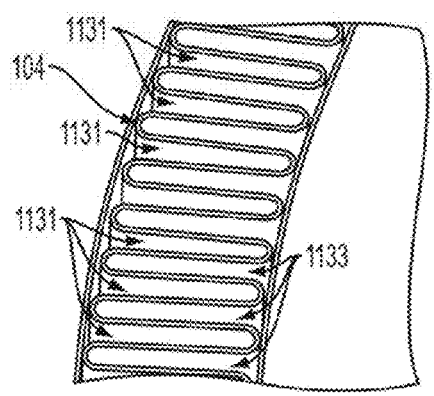
FIG. 11A
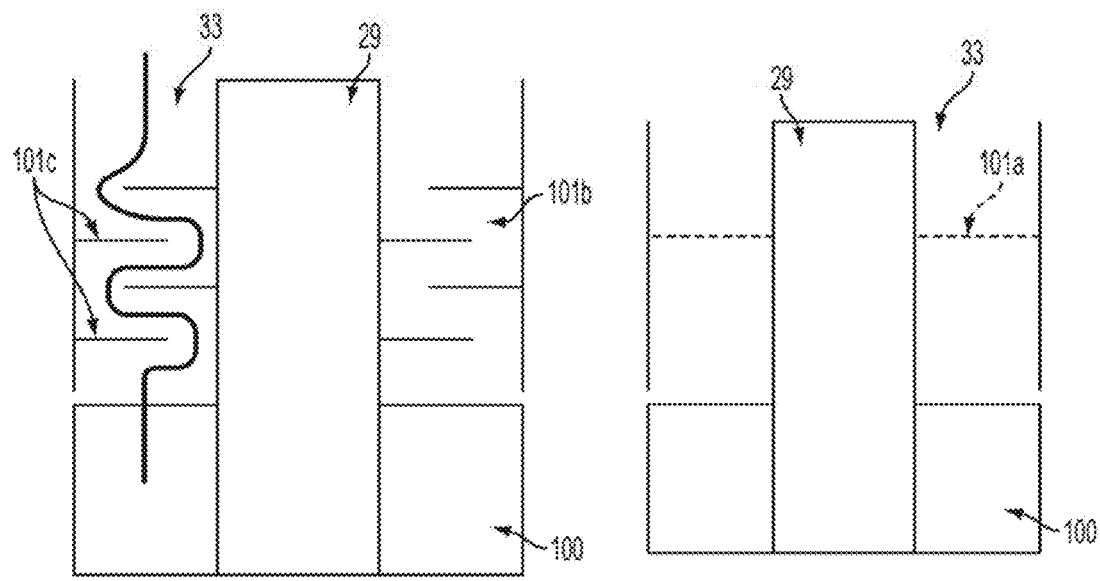
FIG. 11C
FIG. 11B

SOFC HOT BOX COMPONENTS

FIELD

The present invention is directed to fuel cell systems, specifically to components for a solid oxide fuel cell (SOFC) system hot box.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

FIGS. 1-9 illustrate a prior art fuel cell system described in U.S. Published Application 2010/0009221 published on Jan. 14, 2010 (filed as Ser. No. 12/458,171 and incorporated herein by reference in its entirety. Specifically, with reference to FIGS. 1, 2A, 2B and 3A, an integrated fuel cell unit 10 is shown in form of an integrated solid oxide fuel cell ("SOFC")/fuel processor 10 having a generally cylindrical construction. The unit 10 includes an annular array 12 of eight (8) fuel cell stacks 14 surrounding a central axis 16, with each of the fuel cell stacks 14 having a stacking direction extended parallel to the central axis 16, with each of the stacks having a face 17 that faces radially outward and a face 18 that faces radially inward. As best seen in FIG. 3A the fuel cell stacks 14 are spaced angularly from each other and arranged to form a ring-shaped structure about the axis 16. Because there are eight of the fuel cell stacks 14, the annular array 12 could also be characterized as forming an octagon-shaped structure about the axis 16. While eight of the fuel cell stacks 14 have been shown, it should be understood that the invention contemplates an annular array 12 that may include more than or less than eight fuel cell stacks.

With reference to FIG. 1, the unit 10 further includes an annular cathode recuperator 20 located radially outboard from the array 12 of fuel stacks 14, an annular anode recuperator 22 located radially inboard from the annular array 12, a reformer 24 also located radially inboard of the annular array 12, and an annular anode exhaust cooler/cathode preheater 26, all integrated within a single housing structure 28. The housing structure 28 includes an anode feed port 30, an anode exhaust port 32, a cathode feed port 34, a cathode exhaust port 36, and an anode combustion gas inlet port 37. An anode exhaust combustor (typically in the form an anode tail gas oxidizer (ATO) combustor), shown schematically at 38, is a component separate from the integrated unit 10 and receives an anode exhaust flow 39 from the port 32 to produce an anode combustion gas flow 40 that is delivered to the anode combustion gas inlet 37. During startup, the combustor 38 also receives a fuel flow (typically natural gas), shown schematically by arrow 41. Additionally, some of the anode exhaust flow may be recycled to the anode feed port 30, as shown by arrows 42. In this regard, a suitable valve 43 may be provided to selectively control the routing of the anode exhaust flow to either the combustor 38 or the anode feed port 30. Furthermore, although not shown, a blower may be required in order to provide adequate pressurization of the recycled anode exhaust flow 42. While FIGS. 1, 2A and 2B are section views, it will be seen in the later figures that the components and features of the integrated unit 10 are symmetrical about the axis 16, with the exception of the ports 34, 36 and 37.

With reference to FIG. 1 and FIG. 2A, the cathode flows will be explained in greater detail. As seen in FIG. 1, a cathode feed (typically air), shown schematically by arrows 44, enters the unit 10 via the port 34 and passes through an annular passage 46 before entering a radial passage 48. It should be noted that as used herein, the term "radial passage" is intended to refer to a passage wherein a flow is directed either radially inward or radially outward in a generally symmetric 360 degree pattern. The cathode feed 44 flows radially outward through the passage 48 to an annular passage 50 that surrounds the array 12 and passes through the cathode recuperator 20. The cathode feed 44 flows downward through the annular passage 50 and then flows radially inward to an annular feed manifold volume 52 that surrounds the annular array 12 to distribute the cathode feed 44 into each of the fuel cell stacks 14 where the cathode feed provides oxygen ions for the reaction in the fuel cell stacks 14 and exits the fuel cell stacks 14 as a cathode exhaust 56. The cathode exhaust 56 then flows across the reformer 24 into an annular exhaust manifold area 58 where it mixes with the combustion gas flow 40 which is directed into the manifold 58 via an annular passage 60. In this regard, it should be noted that the combustion gas flow 40 helps to make up for the loss of mass in the cathode exhaust flow 56 resulting from the transport of oxygen in the fuel cell stacks 14. This additional mass flow provided by the combustion gas flow 40 helps in minimizing the size of the cathode recuperator 20. The combined combustion gas flow 40 and cathode exhaust 56, shown schematically by arrows 62, exits the manifold 58 via a central opening 64 to a radial passage 66. The combined exhaust 62 flows radially outward through the passage 66 to an annular exhaust flow passage 68 that passes through the cathode recuperator 20 in heat exchange relation with the passage 50 to transfer heat from the combined exhaust 62 to the cathode feed 44. The combined exhaust 62 flows upward through the annular passage 68 to a radial passage 70 which directs the combined exhaust 62 radially inward to a final annular passage 72 before exiting the unit 10 via the exhaust port 36.

With reference to FIG. 1 and FIG. 2B, an anode feed, shown schematically by arrows 80, enters the unit 10 via the anode feed inlet port 30 preferably in the form of a mixture of recycled anode exhaust 42 and methane. The anode feed 80 is directed to an annular passage 82 that passes through the anode recuperator 22. The anode feed 80 then flows to a radial flow passage 84 where anode feed 80 flows radially outward to an annular manifold or plenum 86 that directs the anode feed into the reformer 24. After being reformed in the reformer 24, the anode feed 80 exits the bottom of reformer 24 as a reformate and is directed into an integrated pressure plate/anode feed manifold 90. The feed manifold 90 directs the anode feed 80 to a plurality of stack feed ports 92, with one of the ports 92 being associated with each of the fuel cell stacks 14. Each of the ports 92 directs the anode feed 80 into a corresponding anode feed/return assembly 94 that directs the anode feed 82 into the corresponding fuel cell stack 14 and collects an anode exhaust, shown schematically by arrows 96, from the corresponding stack 14 after the anode feed reacts in the stack 14. Each of the anode feed/return assemblies 94 directs the anode exhaust 96 back into a corresponding one of a plurality of stack ports 98 in the pressure plate/manifold 90 (again, one port 98 for each of the fuel cell stacks 14). The manifold 90 directs the anode exhaust 96 radially inward to eight anode exhaust ports 100 (again, one for each stack 14) that are formed in the pressure plate/manifold 90. The anode exhaust 96 flows through the ports 100 into a plurality of corresponding anode exhaust tubes 102 which direct the anode exhaust 96 to a radial anode exhaust flow passage 104. The anode exhaust 96 flows radially inward through the passage 104 to an annular flow passage 106 that passes downward through the anode recuperator 22 in heat exchange relation with the flow passage 82. The anode exhaust 96 is then directed from the annular passage 106 upward into a tubular passage 108 by a baffle/cover 110 which is preferably dome-shaped. The anode exhaust 96 flows upwards through the passage 108 before being directed into another annular passage 112 by a baffle/cover 114, which again is preferably dome-shaped. The annular passage 112 passes through the anode cooler 26 in heat exchange relation with the annular cathode feed passage 46. After transferring heat to the cathode feed 44, the anode exhaust 96 exits the annular passage 112 and is directed by a baffle 116, which is preferably cone-shaped, into the anode exhaust port 32.

With reference to FIGS. 3A, 3B, the reformer 24 is provided in the form of an annular array 280 of eight tube sets 282, with each tube set 282 corresponding to one of the fuel cell stacks 14 and including a row of flattened tubes 284. In this regard, it should be noted that the number of tubes 284 in the tube sets 282 will be highly dependent upon the particular parameters of each application and can vary from unit 10 to unit 10 depending upon those particular parameters.

FIG. 3C is intended as a generic figure to illustrate certain construction details common to the cathode recuperator 20, the anode recuperator 22, and the anode cooler 26. The construction of each of these three heat exchangers basically consists of three concentric cylindrical walls A, B, C that define two separate flow passages D and E, with corrugated or serpentine fin structures G and H provided in the flow passages D and E, respectively, to provide surface area augmentation of the respective flow passages. Because the heat transfer occurs through the cylindrical wall B, it is preferred that the fins G and H be bonded to the wall B in order to provide good thermal conductivity, such as by brazing. On the other hand, for purposes of assembly and/or allowing differential thermal expansion, it is preferred that the fins G and H not be bonded to the cylindrical walls A and C. For each of the heat exchangers 20, 22 and 26, it should be understood that the longitudinal length and the specific geometry of the fins G and H in each of the flow paths D and E can be adjusted as required for each particular application in order to achieve the desired output temperatures and allowable pressure drops from the heat exchangers.

Turning now to FIG. 4A-D, the anode cooler 26 includes a corrugated or serpentine fin structure 300 to provide surface area augmentation for the anode exhaust 96 in the passage 112, a corrugated or serpentine fin structure 302 that provides surface area augmentation for the cathode feed flow 44 in the passage 46, and a cylindrical wall or tube 304 to which the fins 300 and 302 are bonded, preferably by brazing, and which serves to separate the flow passage 46 from the flow passage 112. As best seen in FIG. 4B, a cylindrical flow baffle 306 is provided on the interior side of the corrugated fin 300 and includes the dome-shaped baffle 114 on its end in order to define the inner part of flow passage 112. A donut-shaped flow baffle 308 is also provided to direct the cathode feed 44 radially outward after it exists the flow passage 46. The cone-shaped baffle 116 together with the port 32 are attached to the top of the tube 304, and include a bolt flange 310 that is structurally fixed, by a suitable bonding method such as brazing or welding, to the port 32, which also includes a bellows 311 to allow for thermal expansion between the housing 28 and the components connected through the flange 310. As seen in FIG. 4C, the above-described components can be assembled as yet another subassembly that is bonded together, such as by brazing.

In reference to FIGS. 1 and 4D, it can be seen that the anode recuperator 22 includes a corrugated or serpentine fin structure 312 in the annular flow passage 82 for surface area augmentation for anode feed 80. As best seen in FIG. 1, the anode recuperator 22 further includes another corrugated or serpentine fin structure 314 in the annular flow passage 106 for surface augmentation of the anode exhaust 96.

As best seen in FIG. 4D, corrugated fins 312 and 314 are preferably bonded to a cylindrical wall of tube 316 that serves to separate the flow passages 82 and 106 from each other, with the dome-shaped baffle 110 being connected to the bottom end of the wall 316. Another cylindrical wall or tube 320 is provided radially inboard from the corrugated fin 314 (not shown in FIG. 4D, but in a location equivalent to fin 300 in cylinder 304 as seen in FIG. 4B) to define the inner side of the annular passage 106, as best seen in FIG. 4D. As seen in FIG. 2A, an insulation sleeve 322 is provided within the cylindrical wall 320 and a cylindrical exhaust tube 324 is provided within the insulation sleeve 322 to define the passage 108 for the anode exhaust 96. Preferably, the exhaust tube 324 is joined to a conical-shaped flange 328 provided at a lower end of the cylindrical wall 320. With reference to FIG. 4D, another cylindrical wall or tube 330 surrounds the corrugated fin 312 to define the radial outer limit of the flow passage 82 and is connected to the inlet port 30 by a conical-shaped baffle 332. A manifold disk 334 is provided at the upper end of the wall 316 and includes a central opening 336 for receiving the cylindrical wall 320, and eight anode exhaust tube receiving holes 338 for sealingly receiving the ends of the anode exhaust tubes 102, with the plate 308 serving to close the upper extent of the manifold plate 334 in the assembled state.

With reference to FIGS. 2B and 4E, a heat shield assembly 350 is shown and includes an inner cylindrical shell 352 (shown in FIG. 2B), an outer cylindrical shell 354, an insulation sleeve 356 (shown in FIG. 2B) positioned between the inner and outer shells 352 and 354, and a disk-shaped cover 358 closing an open end of the outer shell 350. The cover 358 includes eight electrode clearance openings 360 for through passage of the electrode sleeves 211. As seen in FIG. 4E, the heat shield assembly 350 is assembled over an insulation disk 361 the outer perimeter of the assembled array 12 of fuel cells 14 and defines the outer extent of the cathode feed manifold 52. The heat shield 350 serves to retain the heat associated with the components that it surrounds. FIG. 5 shows the heat shield assembly 350 mounted over the stacks 14.

With reference to FIG. 1 and FIG. 6, the cathode recuperator 20 includes a corrugated or serpentine fin structure 362 to provide surface enhancement in the annular flow passage 68 for the combined exhaust 62, a corrugated or serpentine fin structure 364 to provide surface enhancement in the annular flow passage 50 for the cathode feed 44, and a cylindrical tube or wall 366 that separates the flow passages 50 and 68 and to which the fins 362 and 364 are bonded. A disk-shaped cover plate 368 is provided to close the upper opening of the cylindrical wall 366 and includes a central opening 370, and a plurality of electrode clearance openings 372 for the passage of the electrode sleeve 211 therethrough. A cylindrical tube or sleeve 376 is attached to the cover 368 to act as an outer sleeve for the anode cooler 26, and an upper annular bolt flange 378 is attached to the top of the sleeve 376. A lower ring-shaped bolt flange 380 and an insulation sleeve 382 are fitted to the exterior of the sleeve 376, and a cylindrical wall or shield 384 surrounds the insulation sleeve 382 and defines an inner wall for the passage 72, as best seen in FIGS. 1 and 6.

With reference to FIG. 7, the components of FIG. 6 are then assembled over the components shown in FIG. 5 with the flange 378 being bolted to the flange 310.

With reference to FIG. 4A, the outer housing 28 is assembled over the remainder of the unit 10 and bolted thereto at flange 380 and a flange 400 of the housing 28, and at flange 402 of the assembly 237 and a flange 404 of the housing 28, preferably with a suitable gasket between the flange connections to seal the connections.

FIG. 9 is a schematic representation of the previously described integrated unit 10 showing the various flows through the integrated unit 10 in relation to each of the major components of the integrated unit 10. FIG. 9 also shows an optional air cooled anode condenser 460 that is preferably used to cool the anode exhaust flow 39 and condense water therefrom prior to the flow 39 entering the combustor 38. If desired, the condenser may be omitted. FIG. 9 also shows a blower 462 for providing an air flow to the combustor 38, a blower 464 for providing the cathode feed 44, and a blower 466 for pressurizing the anode recycle flow 42. If desired, in an alternate embodiment of the unit 10 shown in FIG. 9 also differs from the previously described embodiment shown in FIG. 1 in that an optional steam generator (water/combined exhaust heat exchanger) 440 is added in order to utilize waste heat from the combined exhaust 62 to produce steam during startup. In this regard, a water flow 442 is provided to a water inlet port 444 of the heat exchanger 440, and a steam outlet port directs a steam flow 448 to be mixed with the anode feed 80 for delivery to the anode feed inlet port 30.

SUMMARY

An embodiment relates to a method of operating a solid oxide fuel cell system including providing a solid oxide fuel cell stack anode exhaust stream to an anode tail gas oxidizer (ATO) and providing a solid oxide fuel cell stack cathode exhaust stream to the ATO to oxidize the anode exhaust stream in the ATO. No external fuel is provided to the ATO other than the anode exhaust stream.

Another embodiment relates to a method of operating a solid oxide fuel cell system. The method includes providing a fuel inlet stream into a solid oxide fuel cell stack, providing an air inlet stream into the fuel cell stack and providing an anode exhaust stream from the fuel cell stack into a splitter. The method also includes providing a first portion of the anode exhaust stream from the splitter into an anode tail gas oxidizer (ATO) and providing a second portion of the anode exhaust stream from the splitter into an anode cooler heat exchanger to pre-heat the air inlet stream before it reaches the fuel cell stack. The splitter, the solid oxide fuel cell stack and the anode cooler heat exchanger are located in the same hot box and the first and the second portions of the anode exhaust stream are split inside the hot box.

Another embodiment relates to a fuel cell system including a hot box and a fuel cell stack, an anode tail gas oxidizer (ATO), an anode exhaust stream splitter, and an anode cooler heat exchanger located in the hot box. The splitter is configured to provide a first portion of a fuel cell stack anode exhaust stream into the ATO while allowing a remainder of the anode exhaust stream to pass through the splitter into the anode cooler without being provided into the ATO.

BRIEF DESCRIPTION OF THE DRAWINGS

FIG. 3C is a partial section view illustrating construction details common to several heat exchangers contained within the integrated unit of FIG. 1.

FIGS. 4A and 4B are exploded perspective views of the components of an anode exhaust cooler of the integrated unit of FIG. 1.

FIG. 4C is a perspective view showing the components of FIGS. 4A and B in their assembled state.

FIG. 4D is an exploded perspective view showing the assembled components together with an anode recuperator of the integrated unit of FIG. 1.

FIG. 4E is an exploded perspective view showing the components of the fuel cell stacks, anode recuperator and anode cooler together with an insulation disk and heat shield housing of the integrated unit of FIG. 1.

FIG. 5 is a perspective view showing the assembled state of the components of FIG. 4E.

FIG. 6 is an exploded perspective view showing a cathode recuperator assembly together with other components of the integrated unit of FIG. 1.

FIG. 7 is an exploded perspective view showing the assembled components of FIG. 6 together with the assembled components of FIG. 4.

FIG. 8 is an exploded perspective view showing the assembled components of FIG. 7 together with an outer housing of the integrated unit of FIG. 1.

FIG. 11A is a top cross sectional view of a portion of the anode exhaust cooler heat exchanger of FIG. 10A.

FIG. 11B is a side sectional view of a baffle plate located over the anode exhaust cooler heat exchanger of FIG. 10A.

FIG. 11C is a schematic illustration of a flow director device according to an embodiment.

DETAILED DESCRIPTION OF THE EMBODIMENTS

The embodiments of the invention provide fuel cell hot box components which improve the fuel cell system performance. Embodiments include an anode exhaust cooler heat exchanger with "finger plates", a cathode recuperator uni-shell, a cathode recuperator uni-shell ceramic column support and expansion bellows, a cathode exhaust steam generator structure, a pre-reformer tube-insert catalyst, an anode flow structure hub, an anode tail gas oxidizer (ATO) air swirl element, an ATO fuel injector, and a pour-in outer-insulation and simplified stack electrical terminals.

Anode Exhaust Cooler Heat Exchanger

It is desirable to increase overall flow conditions and rates of the fluids (e.g., fuel and air inlet and exhaust streams) in the hot box. According to the first embodiment, an anode exhaust cooler heat exchanger with "finger plates" facilitates these higher overall flow conditions. An anode cooler heat exchanger is a heat exchanger in which the hot fuel exhaust stream from a fuel cell stack exchanges heat with a cool air inlet stream being provided to the fuel cell stack (such as a SOFC stack). This heat exchanger is also referred to as an air pre-heater heat exchanger in U.S. application Ser. No. 12/219,684 filed on Jul. 25, 2008 and Ser. No. 11/905,477 filed on Oct. 1, 2007, both of which are incorporated herein by reference in their entirety.

Figure 10A:
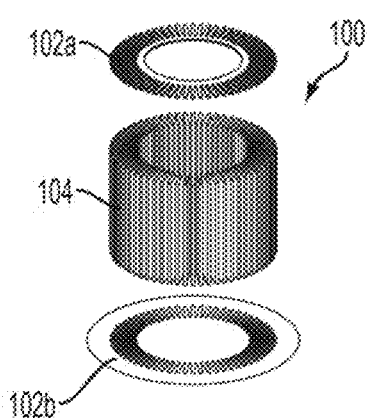
FIG. 10A is an exploded view of an anode exhaust cooler heat exchanger having two finger plates according to an embodiment.
Figure 10B:
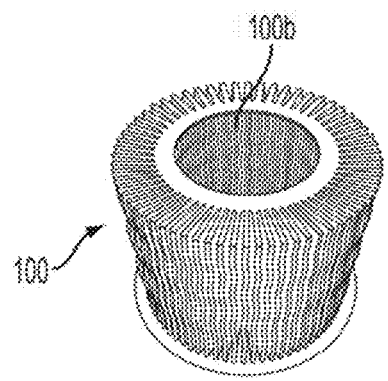
FIG. 10B is a photograph of an exemplary anode exhaust cooler heat exchanger of FIG. 10A.

An exemplary anode exhaust cooler heat exchanger 100 is illustrated in FIGS. 10A-10B and 11. Embodiments of the anode exhaust cooler heat exchanger 100 include two "finger" plates 102a, 102b sealed on opposite ends of a corrugated sheet 104, as shown in FIG. 10A. The corrugated sheet 104 may have a cylindrical shape (i.e., a cylinder with a corrugated outer wall) and the finger plates 102a, 102b are located on the opposite ends of the cylinder. That is, the peaks and valleys of the corrugations may be aligned parallel to the axial direction of the cylinder with the finger plates 102a, 102b designed to cover alternating peaks/valleys. Other shapes (e.g., hollow rectangle, triangle or any polygon) are also possible for the sheet 104. The finger plates comprise hollow ring shaped metal plates which have finger shaped extensions which extend into the inner portion of the ring. The plates 102a, 102b are offset from each other by one corrugation, such that if the fingers of top plate 102a cover every inward facing recess in sheet 104, then bottom plate 102b fingers cover every outward facing recess in sheet 104 (as shown in FIG. 10B which illustrates an assembled heat exchanger 100), and vise-versa. The shape of each finger is configured to cover one respective recess/fin/corrugation in sheet 104. The fingers may be brazed to the sheet 104.

The corrugations or fins of the sheet 104 may be straight as shown in FIGS. 10A and 11 or wavy as shown in FIG. 10B. The wavy fins are fins which are not straight in the vertical direction. Such wavy fins are easier to manufacture.

Figure 10C:
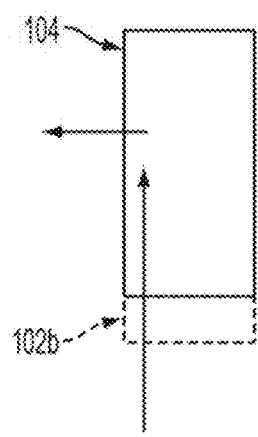
FIG. 10C is a schematic illustration showing axial gas flow entry/exit in an anode exhaust cooler heat exchanger having finger plates.
Figure 10D:
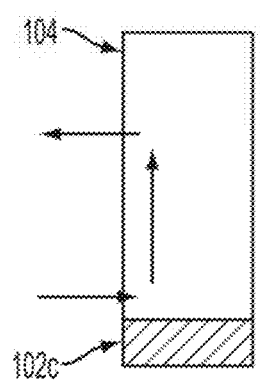
FIG. 10D is a schematic illustration showing non-axial gas flow entry/exit in an anode exhaust cooler heat exchanger having cap rings.

The use of the finger plates 102a, 102b is not required. The same function could be achieved with the use of flat cap rings or end caps 102c that are brazed to the top/bottom of the fins 104, as shown in FIG. 10D. The advantage of the finger plate 102a, 102b design is that it allows for axial gas flow entry and/or exit to and from the fins 104, as shown schematically by the arrows in FIG. 10C. In contrast, as shown in FIG. 10D, the cap ring(s) 102c require the gas flow to enter and/or exit non-axially to and from the fins 104 and then turn axially inside the fins 104 which results in an increased pressure drop. The anode cooler heat exchanger 100 may be fabricated with either the finger plates 102a, 102b or the end caps 102c located on either end or a combination of both. In other words, for the combination of finger plate and end cap, the top of the fins 104 may contain one of finger plate or end cap, and the bottom of the fins may contain the other one of the finger plate or end cap.

Hot and cold flow streams 1131, 1133 flow in adjacent corrugations, where the metal of the corrugated sheet 104 separating the flow streams acts as a primary heat exchanger surface, as shown in FIG. 11A, which is a top cross sectional view of a portion of sheet 104. The sheet 104 may be relatively thin, such as having a thickness of 0.005 to 0.003 inches, for example 0.012-0.018 inches, to enhance the heat transfer. For example, the hot fuel exhaust stream flows inside of the corrugated sheet 104 (including in the inner recesses of the corrugations) and the cold air inlet stream flows on the outside of the sheet 104 (including the outer recesses of the corrugations). Alternatively, the anode exhaust cooler heat exchanger may be configured so that the fuel exhaust flows on the outside and the air inlet stream on the inside of sheet 104. The finger plates 102a and 102b prevent the hot and cold flows from mixing as they enter and exit the anode exhaust cooler heat exchanger.

One side (e.g., inner side) of the corrugated sheet is in fluid communication with a fuel exhaust conduit which is connected to the fuel exhaust of the solid oxide fuel cell stack and in fluid communication with an exhaust conduit from an anode recuperator heat exchanger which will be described below. The second side of the corrugated sheet is in fluid communication with an air inlet stream conduit which will be described in more detail below.

Figure 17A:
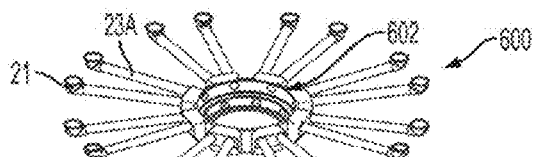
FIG. 17A is a three dimensional view of an anode hub flow structure according to an embodiment.
Figure 17B:
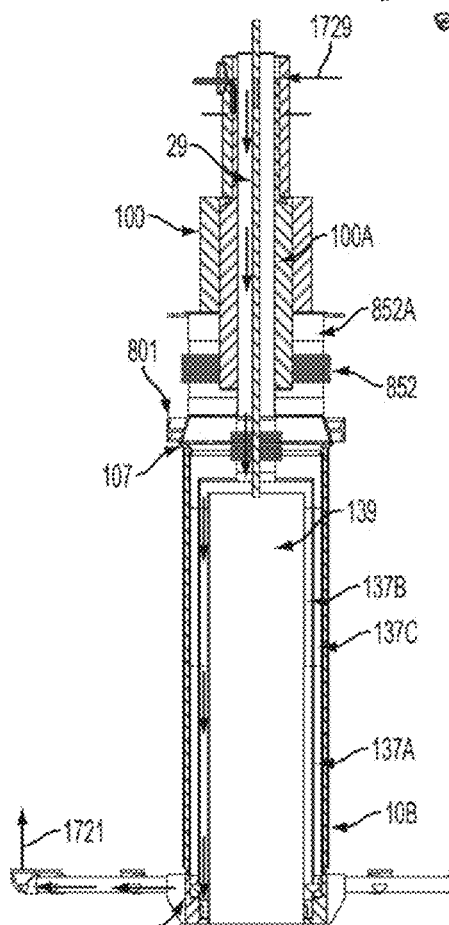
FIGS. 17B and 17C are side cross sectional views of an anode recuperator according to an embodiment.
Figure 17C:
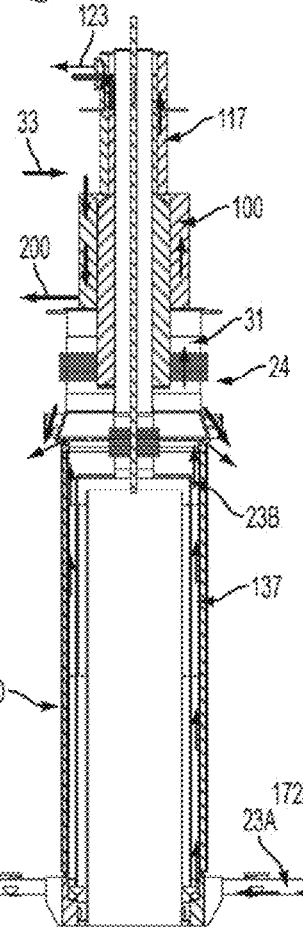
Figure 17D:
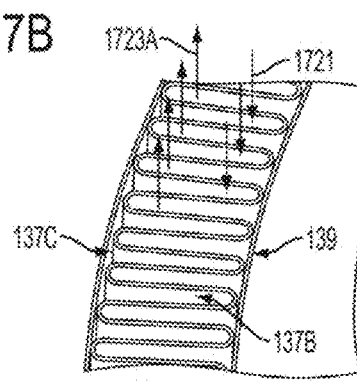
FIG. 17D is a top cross sectional view of the anode recuperator of FIGS. 17B and 17C.

The air inlet stream into the anode exhaust cooler 100 may be directed toward the centerline of the device, as shown in FIG. 17C. Alternatively, the air inlet stream may have a full or partial tangential component upon entry into the device. Furthermore, if desired, an optional baffle plate 101a or another suitable flow director device 101b may be located over the anode exhaust cooler 100 in the air inlet conduit or manifold 33 to increase the air inlet stream flow uniformity across the anode exhaust cooler 100, as shown in FIGS. 11B-11D.

Figure 11D:
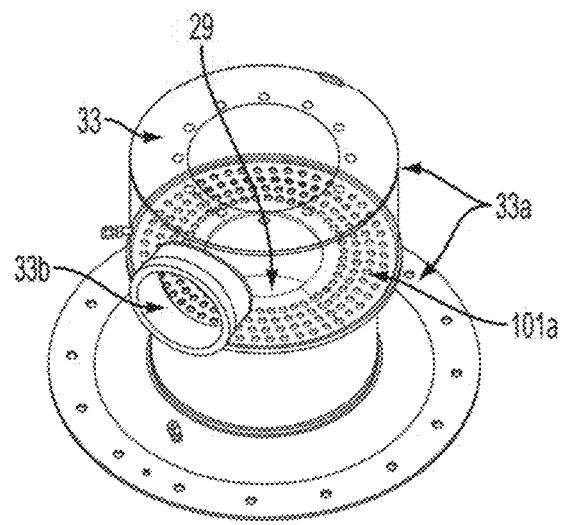
FIG. 11D is a semi-transparent three dimensional view of a baffle plate located over the anode exhaust cooler heat exchanger of FIG. 10A.

FIGS. 11B and 11D illustrate a side cross sectional and semi-transparent three dimensional views, respectively, of the baffle plate 101a located over the anode exhaust cooler 100 in the air inlet conduit or manifold 33. The baffle plate may comprise a cylindrical plate having a plurality of openings. The openings may be arranged circumferentially in one or more circular designs and each opening may have a circular or other (e.g., oval or polygonal) shape.

FIG. 11C shows a flow director device 101b which comprises a series of offset baffles 101c which create a labyrinth gas flow path between the baffles, as shown by the curved line. If desired, the baffle plate 101a openings and/or the baffle 101c configurations may have an asymmetric or non-uniform geometry to encourage gas flow in some areas of the anode exhaust cooler and restrict the gas flow in other areas of the anode exhaust cooler.

FIG. 11D also shows a roughly cylindrical air inlet conduit enclosure 33a having an air inlet opening 33b. The air inlet conduit or manifold 33 is located between the inner wall of enclosure 33a and the outer wall of the annular anode exhaust conduit 117, as shown in dashed lines in FIG. 11E. Enclosure 33a also surrounds the anode cooler 100a to provide the air inlet stream passages between the fins of plate 104 and the inner wall of enclosure 33a.

Figure 11E:
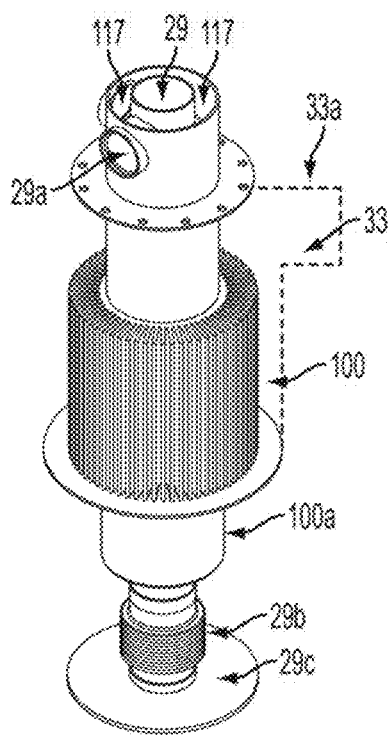
FIG. 11E is a three dimensional view illustrating an anode exhaust cooler heat exchanger and a fuel inlet conduit according to an embodiment.
Figure 11F:
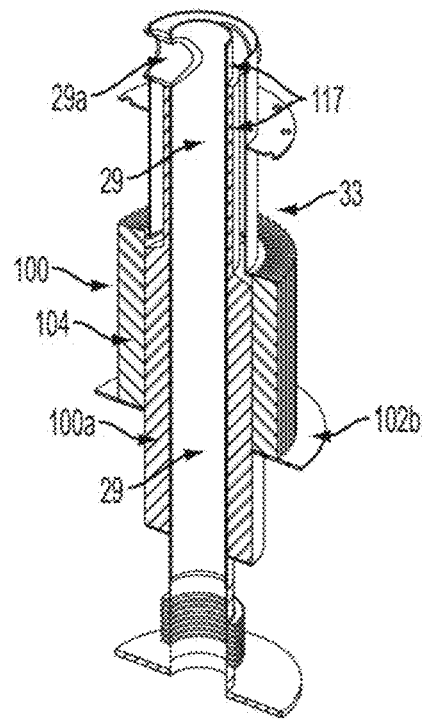
FIG. 11F is a three dimensional cut-away view of the anode exhaust cooler heat exchanger and fuel inlet conduit of FIG. 11E.

FIGS. 11D, 11E and 11F also show the fuel inlet conduit 29 which bypasses the anode exhaust cooler through the central hollow space in the anode exhaust cooler 100. FIG. 11E is a three dimensional view and FIG. 11F is a three dimensional cut-away view of the device. As shown in FIGS. 11E-11F, the cylindrical corrugated sheet 104 and the disc shaped finger plates (e.g., 102b) of the anode cooler 100 have a hollow space in the middle. The fuel inlet conduit 29 and annular thermal insulation 100A are located in this hollow space 100b (shown in FIG. 10B). The annular thermal insulation 100a surrounds the fuel inlet conduit 29 and thermally isolates conduit 29 from the annular anode cooler 100, and the annular fuel (anode) exhaust conduit 117 which surround the insulation 100a, as well as from the annular air inlet conduit or manifold 33 which surrounds the annular anode cooler 100, and the annular fuel (anode) exhaust conduit 117. Thus, the fuel inlet stream passes through the fuel inlet conduit 29 without substantial heat exchange with the gasses (i.e., fuel exhaust stream and air inlet stream) flowing through the anode cooler 100, the fuel exhaust conduit 117 and the air inlet conduit or manifold 33. If desired, the fuel inlet conduit may include an optional bellows 29b with flange 29c, as shown in FIG. 11E.

As shown in FIGS. 11E-11F, the fuel inlet stream enters the device through the fuel inlet opening 29a which is connected to the fuel inlet conduit 29. The vertical conduit 29 has a horizontal bridging portion connected to opening 29a which passes over the air inlet conduit 33 and the fuel exhaust conduit 117 which are in fluid communication with the anode cooler 100. Thus, the fuel inlet stream is fluidly and thermally isolated from the air inlet and fuel exhaust streams in and above the anode cooler 100.

Embodiments of the anode exhaust cooler heat exchanger may have one or more of the following advantages: excellent heat exchange due to minimal material conduction losses between separated flow streams, very compact, light weight, reduced material requirements, reduced manufacturing costs, elimination of fixture requirements, reduced pressure drop, ability to control flow ratios between two or more flow streams by simply changing finger plate design. The duty of the anode exhaust cooler heat exchanger may be increased by 20-40% over the prior art heat exchanger. Further, in some embodiments, the anode exhaust cooler heat exchanger may also be shorter than the prior art heat exchanger in addition to having a higher duty.

Cathode Recuperator Uni-shell

The cathode recuperator is a heat exchanger in which the air inlet stream exchanges heat with the air (e.g., cathode) exhaust stream from the fuel cell stack. Preferably, the air inlet stream is preheated in the anode cooler described above before entering the cathode recuperator.

The mode of heat transfer through the prior art brazed two finned cylindrical heat exchanger is defined by that amount of conductive heat transfer that is possible through the brazed assembly of the heat exchange structure. The potential lack of heat transfer can cause thermal instability of the fuel cell system and also may not allow the system to operate at its rated conditions. The inventors realized that the use of a single fin flow separator improves the heat transfer between fluid streams and provides for a compact heat exchanger package.

Figure 3A:
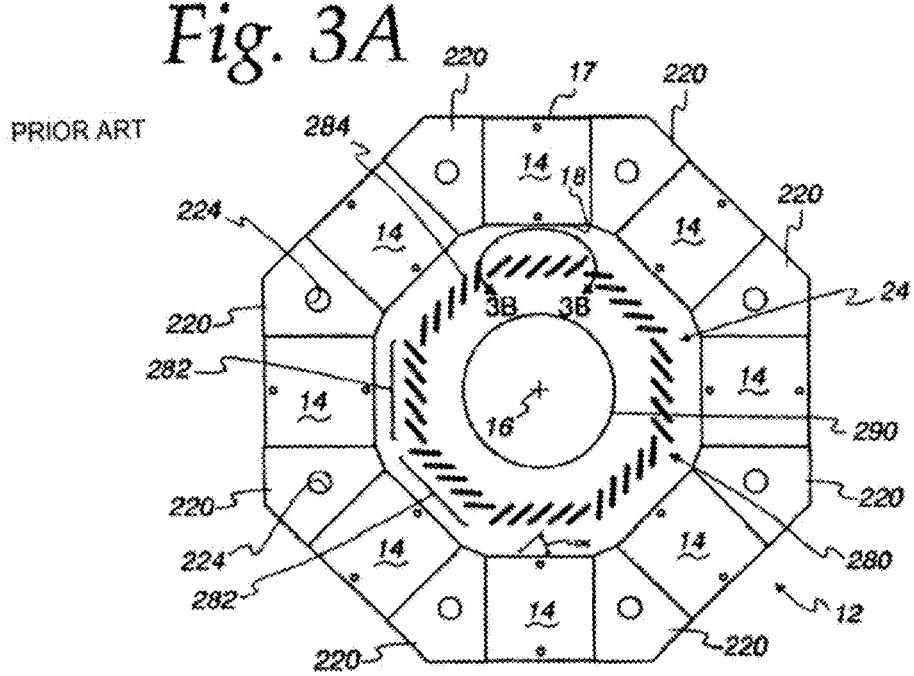
FIG. 3A is a sectional view taken from line 3A-3A in FIG. 1, but showing only selected components of the fuel cell unit.
Figure 12B:
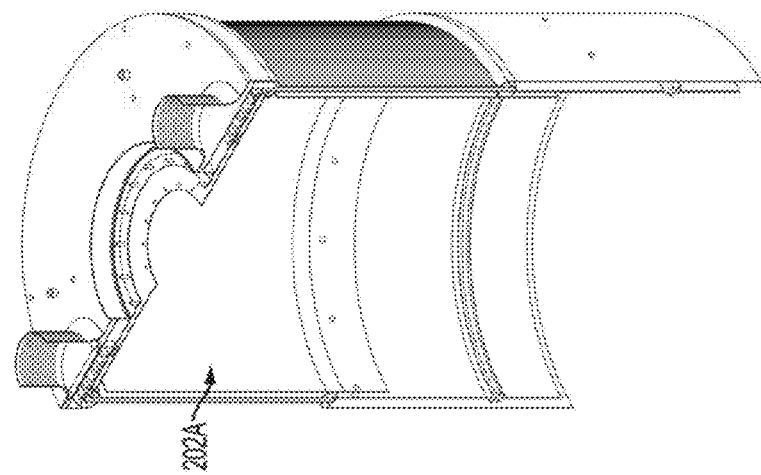
FIGS. 12A-12H are sectional views of a cathode recuperator according to an embodiment.
Figure 12A:
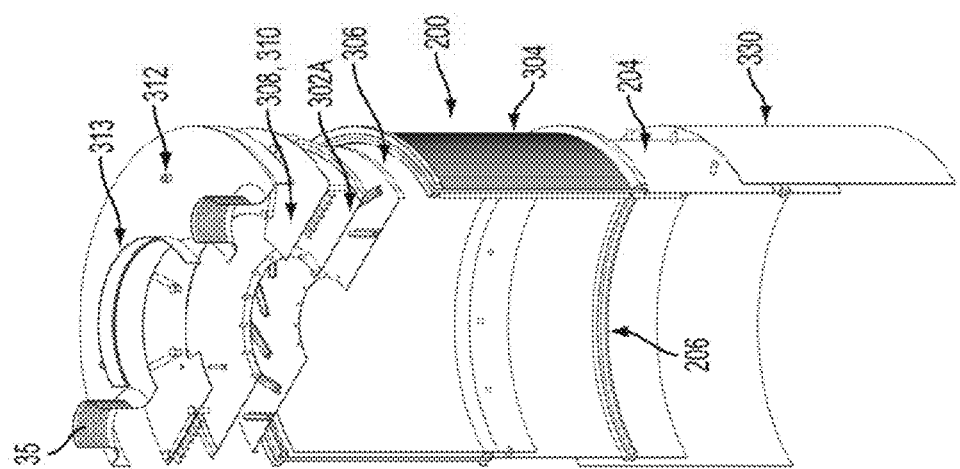
Figure 12C:
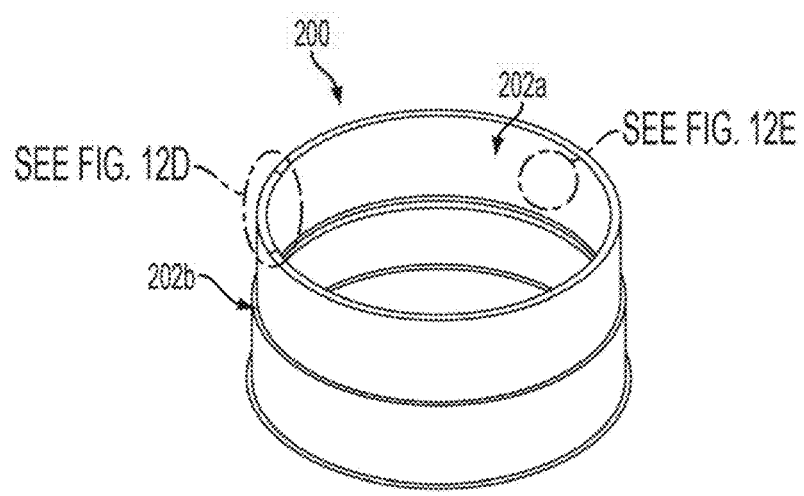

An example cathode recuperator 200 uni-shell is illustrated in FIGS. 12A to 12G. In an embodiment, the three concentric and independent shells A, B and C of FIG. 3C of the prior art structure replaced with a single monolithic assembly shown in FIGS. 12A-12B. FIG. 12A shows an exploded three dimensional view of the assembly components without the heat shield insulation and FIGS. 12B and 12C show three dimensional views of the assembly with the components put together and the heat shield insulation 202A, 202B installed.

Figure 12D:
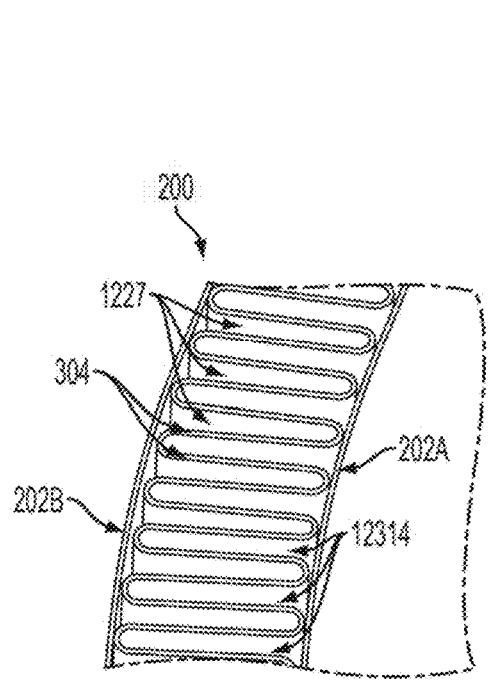
Figure 12E:
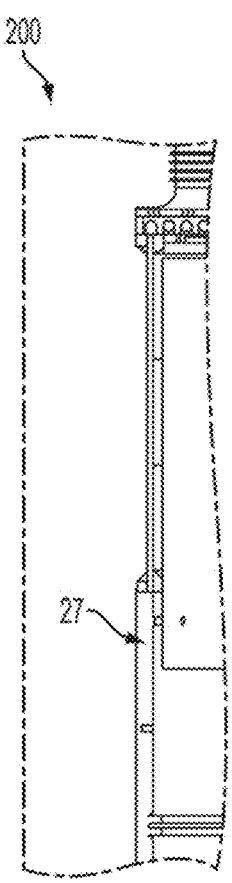
Figure 12G:
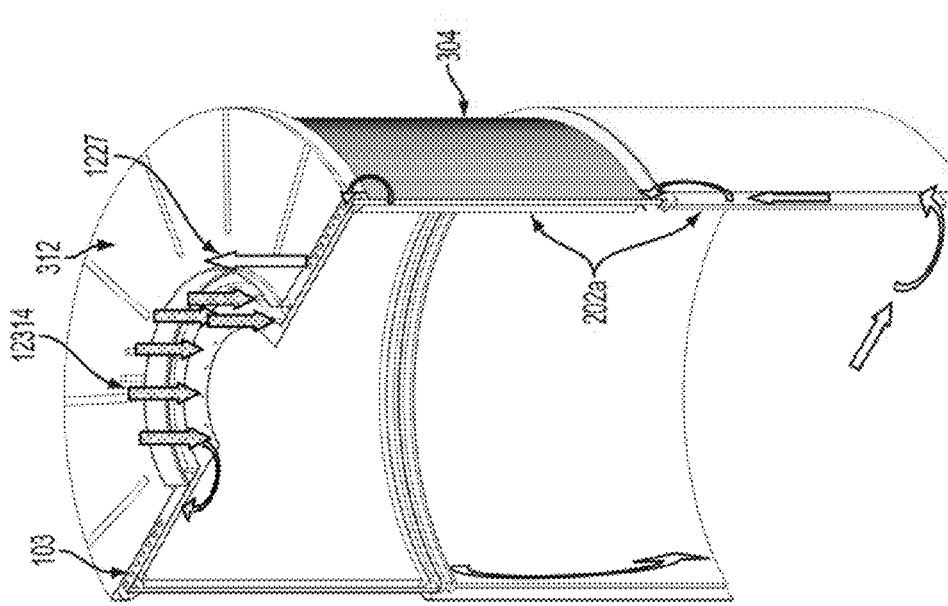

Embodiments of the uni-shell cathode recuperator 200 include a single cylindrical corrugated fin plate or sheet 304 (shown in FIGS. 12A and 12D). The corrugated plate or sheet 304 is preferably ring shaped, such as hollow cylinder. However, plate or sheet 304 may have a polygonal cross section when viewed from the top if desired. The corrugated plate or sheet 304 is located between inner 202A and outer 202B heat shield insulation as shown in FIG. 12C, which is a three dimensional view of the middle portion of the recuperator 200, FIG. 12D which is a top view of the plate or sheet 304, and the FIG. 12E which is a side cross sectional view of the recuperator 200. The heat shield insulation may comprise hollow cylinders. The heat shield insulation may be supported by a heat shield shell 204 located below the corrugated plate or sheet 304.

In addition to the insulation and the corrugated plate or sheet 304, the uni-shell cathode recuperator 200 also includes a top cap, plate or lid 302a (shown in FIG. 12A) and a similar bottom cap plate or lid (not shown in FIG. 12A for clarity). As shown in FIGS. 12A, 12B, 12F and 12G, in addition to the top cap, plate or lid 302a, the hot box may also include a heat shield 306 with support ribs below lid 302a, a steam generator 103 comprising a baffle plate 308 with support ribs supporting a steam coil assembly 310 (i.e., the coiled pipe through which flowing water is heated to steam by the heat of the air exhaust stream flowing around the pipe), and an outer lid 312 with a weld ring 313 enclosing the steam generator 103. A cathode exhaust conduit 35 in outer lid 312 exhausts the air exhaust stream from the hot box.

Figure 12F:
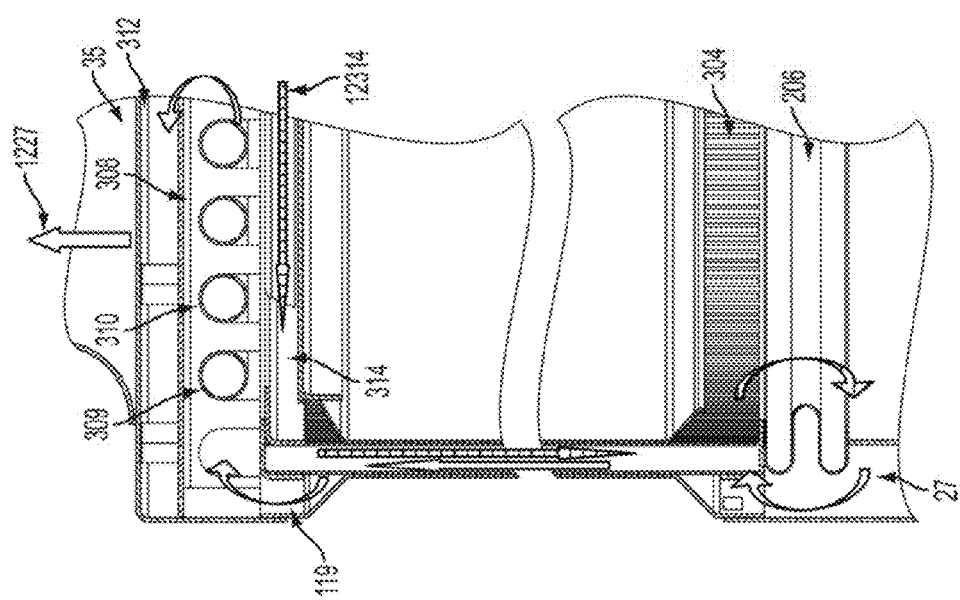

The single cylindrical corrugated fin plate 304 and top and bottom cap plates force the air (i.e., cathode) inlet 12314 and air (i.e., cathode) exhaust streams 1227 to make a non-zero degree turn (e.g., 20-160 degree turn, such as a 90 degree) turn into adjoining hollow fins of the fin plate 304 as shown in FIGS. 12F (side cross sectional view of the assembly) and 12G (three dimensional view of the assembly). For example, the cathode or air inlet stream flows from the anode cooler 100 to the cathode recuperator 200 through conduit 314 which is located between the heat shield 306 and the top cap 302*a*. The air inlet stream flows substantially horizontally in an outward radial direction (i.e., in to out radially) as shown by the arrows in FIGS. 12F and 12G until the stream impacts the inner surface of the upper portion of the corrugated fin plate 304. The impact forces the stream to make a 90 degree turn and flow down (i.e., in an axial direction) in the inner corrugations. Likewise, the hot cathode exhaust stream shown by arrows in FIGS. 12F and 12G first flows vertically from below through conduit 27 from the ATO and is then substantially horizontally in the end portion of conduit 27 in a substantially inward radial direction to impact the outer surface of the lower portions of the corrugated fin plate 304. This causes the air exhaust stream to make a non-zero degree turn and flow up (i.e., in an axial direction) in the outer corrugations of plate 304. This single layer fin plate 304 design allows for effective heat transfer and minimizes the thermal variation within the system (from the misdistribution of air).

The use of the cap plates in the cathode recuperator is not required. The same function could be achieved with the use of finger plates similar to finger plates 102*a*, 102*b* illustrated for the anode cooler 100. The cathode recuperator heat exchanger 200 may be fabricated with either the finger plates or the end caps located on either end or a combination of both. In other words, for the combination of finger plate and end cap, the top of the fin plate 304 may contain one of finger plate or end cap, and the bottom of the fins may contain the other one of the finger plate or end cap Hot and cold flow streams flow in adjacent corrugations, where the metal of the corrugated plate or sheet 304 separating the flow streams acts as a primary heat exchanger surface, as shown in FIG. 12D, which is a top cross sectional view of a portion of plate or sheet 304. For example, the relatively cool or cold air inlet stream 12314 flows inside of the corrugated plate or sheet 304 (including in the inner recesses of the corrugations) and the relatively warm or hot air exhaust stream 1227 flows on the outside of the plate or sheet 304 (including the outer recesses of the corrugations). Alternatively, the air inlet stream 12314 may flow on the inside and the air exhaust stream 1227 may flow on the outside of the corrugated plate or sheet 304.

One side (e.g., outer side) of the corrugated plate or sheet 304 is in fluid communication with an air exhaust conduit 27 which is connected to the air exhaust of the solid oxide fuel cell stack and/or the ATO exhaust. The second side of the corrugated plate or sheet 304 is in fluid communication with a warm air output conduit 314 of the anode cooler 100 described above.

Figure 12H:
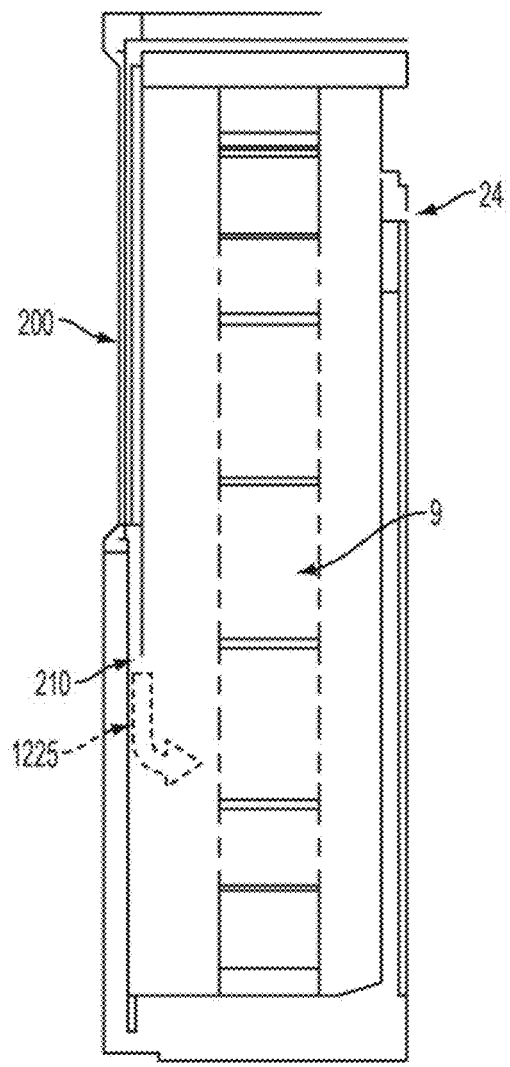

As shown in FIG. 12H, the air inlet stream 1225 exiting the cathode recuperator 200 may be directed towards the middle lengthwise portion of a fuel cell stack or column 9 to provide additional cooling in the otherwise hottest zone of the stack or column 9. In other words, middle portion of the fuel cell stack or column 9 is relatively hotter than the top and bottom end portions. The middle portion may be located between end portions of the stack or column 9 such that each end portion extends 10-25% of the length of the stack or column 9 and the middle portion is 50-80% of the length of the stack or column 9.

The location of the air inlet stream outlet 210 of the recuperator 200 can be tailored to optimize the fuel cell stack or column 9 temperature distributions. Thus, the vertical location of outlet 210 may be adjusted as desired with respect to vertically oriented stack or column 9. The outlet 210 may comprise a circular opening in a cylindrical recuperator 200, or the outlet 210 may comprise one or more discreet openings adjacent to each stack or column 9 in the system.

Since the air inlet stream (shown by dashed arrow in FIG. 12H) exiting outlet 210 is relatively cool compared to the temperature of the stack or column 9, the air inlet stream may provide a higher degree of cooling to the middle portion of the stack or column compared to the end portions of the stack or column to achieve a higher temperature uniformity along the length of the stack of column. For example, the outlet 210 may be located adjacent to any one or more points in the middle 80%, such as the middle 50%, such as the middle 33% of the stack or column. In other words, the outlet 210 is not located adjacent to either the top or bottom end portions each comprising 10%, such as 25% such as 16.5% of the stack or column.

Embodiments of the uni-shell cathode recuperator 200 may have one or more of the following advantages: excellent heat exchange due to minimal material conduction losses between separated flow streams, very compact, light weight, reduced material requirements, reduced manufacturing costs, reduced pressure drop, provides dead weight as insurance for mechanical compression failure. This allows for easier assembly of the fuel cell system, reduced tolerance requirements and easier manufacturing of the assembly.

Thus, as described above, the anode cooler 100 and the cathode recuperator 200 comprise "uni-shell" heat exchangers where the process gases flow on the two opposing surfaces of a roughly cylindrical corrugated sheet. This provides a very short conductive heat transfer path between the streams. The hotter stream (e.g., anode exhaust and ATO exhaust streams in heat exchangers 100, 200, respectively) provides convective heat transfer to a respective large surface area corrugated metal separator sheet 104, 304. Conductive heat transfer then proceeds only through the small thickness of the separator (e.g., the thickness of the corrugated sheet 104, 304), and then convective heat transfer is provided from the sheet 104, 304 to the cooler respective stream (e.g., the air inlet stream in both heat exchangers 100, 200).

The heat exchangers 100, 200 differ in their approach to manifolding their respective process streams. The roughly cylindrical anode cooler 100 uses finger shaped apertures and finger plates 102*a*, 102*b* to allow a substantially axial entry of the process streams (i.e., the anode exhaust and air inlet streams) into the corrugated cylindrical section of the heat exchanger. In other words, the process streams enter the heat exchanger 100 roughly parallel (e.g., within 20 degrees) to the axis of the roughly cylindrical heat exchanger.

In contrast, the cathode recuperator 200 includes top and bottom caps 302*a*, which require the process streams (e.g., the air inlet stream and ATO exhaust stream) to enter the heat exchanger 200 roughly perpendicular (e.g., within 20 degrees) to the axial direction of the heat exchanger 200. Thus, heat exchanger 200 has a substantially non-axial process gas entry into the heat exchanger.

If desired, these manifolding schemes may be switched. Thus, both heat exchangers 100, 200 may be configured with the axial process gas entry or non-axial process gas entry. Alternatively, heat exchanger 200 may be configured with the axial process gas entry and/or heat exchanger 100 may be configured with non-axial process gas entry.

Cathode Recuperator Uni-shell with Ceramic Column Support and Bellows

In the prior fuel cell systems, it is difficult to maintain a continuous mechanical load on the fuel cell stacks or columns of stacks through the full range of thermal operating conditions. To maintain a mechanical load, the prior art systems rely on an external compression system. Embodiments of the present fuel cell system do not include an external compression system. The removal of the external compression system, however, can lead to a loss of mechanical integrity of the fuel cell columns. The inventors have realized, however, that the external compression system can be replaced by an internal compression system comprising either a spring loaded or gravity loaded system or a combination of both. The spring loaded system may comprise any suitable system, such as a system described U.S. patent application Ser. No. 12/892,582 filed on Sep. 28, 2010 and which is incorporated herein by reference in its entirety, which describes an internal compression ceramic spring, and/or or use the uni-shell bellow in conjunction with appropriately tailored thermal expansion of the column and uni-shell material.

Figure 13A:
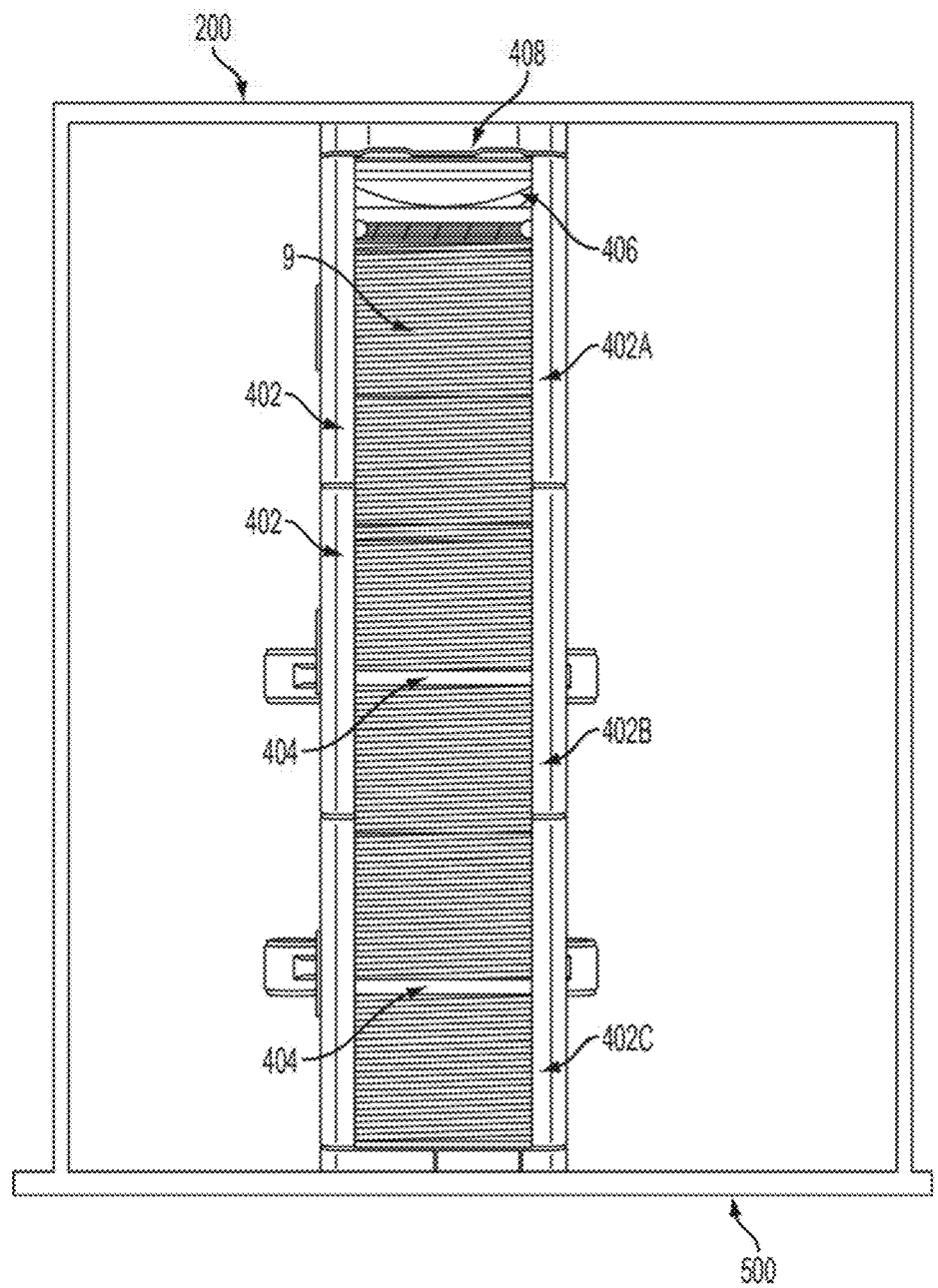
FIG. 13A is a sectional view illustrating a uni-shell recuperator located on the top of one or more columns of fuel cells according to an embodiment.

In an embodiment shown in FIG. 13A, the uni-shell cathode recuperator 200 is located on top of one or more columns 402 to provide additional internal compression for the stack or column of stacks 9. The weight of the recuperator 200 uni-shell cylinder(s) can act directly on the fuel cell columns 9. With the added weight of the cylinders, the fuel cell columns can be prevented from lifting off the hot box base 500 and provide any required sealing forces. Any suitable columns 402 may be used. For example, the ceramic columns 402 described in U.S. application Ser. No. 12/892,582 filed on Sep. 28, 2010 and which is incorporated herein by reference in its entirety may be used.

As discussed in the above described application, the ceramic columns 402 comprise interlocked ceramic side baffle plates 402A, 402B, 402C. The baffle plates may be made from a high temperature material, such as alumina, other suitable ceramic, or a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. Any combination of the matrix and fibers may be used. The ceramic plate shaped baffle plates may be attached to each other using dovetails or bow tie shaped ceramic inserts as described in the Ser. No. 12/892,582 application. Furthermore, as shown in FIG. 13A, one or more fuel manifolds 404 may be provided in the column of fuel cell stacks 9, as described in the Ser. No. 12/892,582 application.

Furthermore, an optional spring compression assembly 406 may be located over the fuel cell column 9 and link adjacent ceramic columns 402 which are located on the opposing sides of the column of fuel cell stacks 9. The assembly 406 may include a ceramic leaf spring or another type of spring between two ceramic plates and a tensioner, as described in the Ser. No. 12/892,582 application. The uni-shell cathode recuperator 200 may be located on a cap 408 on top of the assembly 406, which provides internal compression to the ceramic columns 402 and to the column of fuel cell stacks 9.

Figure 13B:
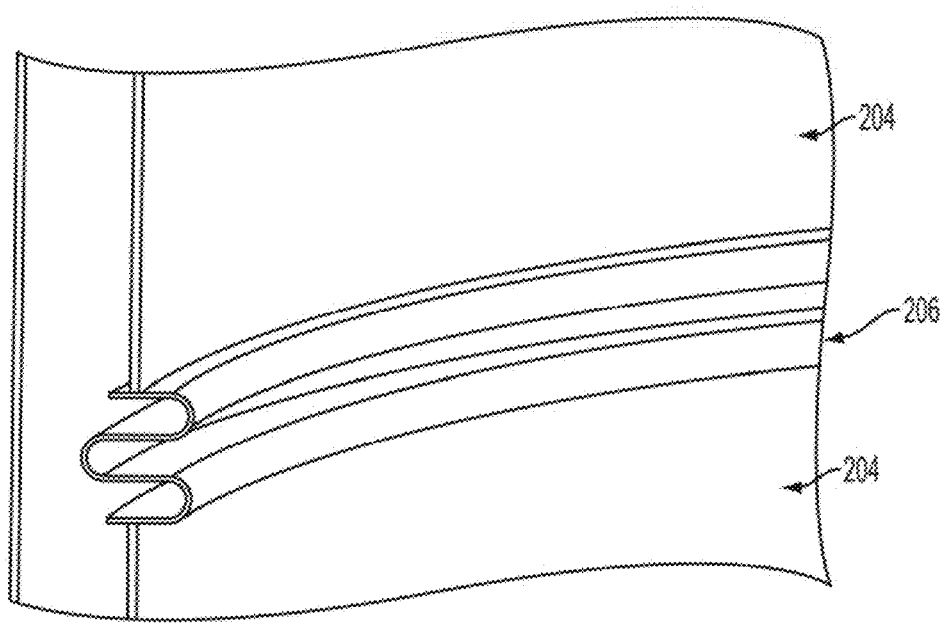
FIG. 13B is a sectional view illustrating a uni-shell recuperator and bellows according to an embodiment.
Figure 16:
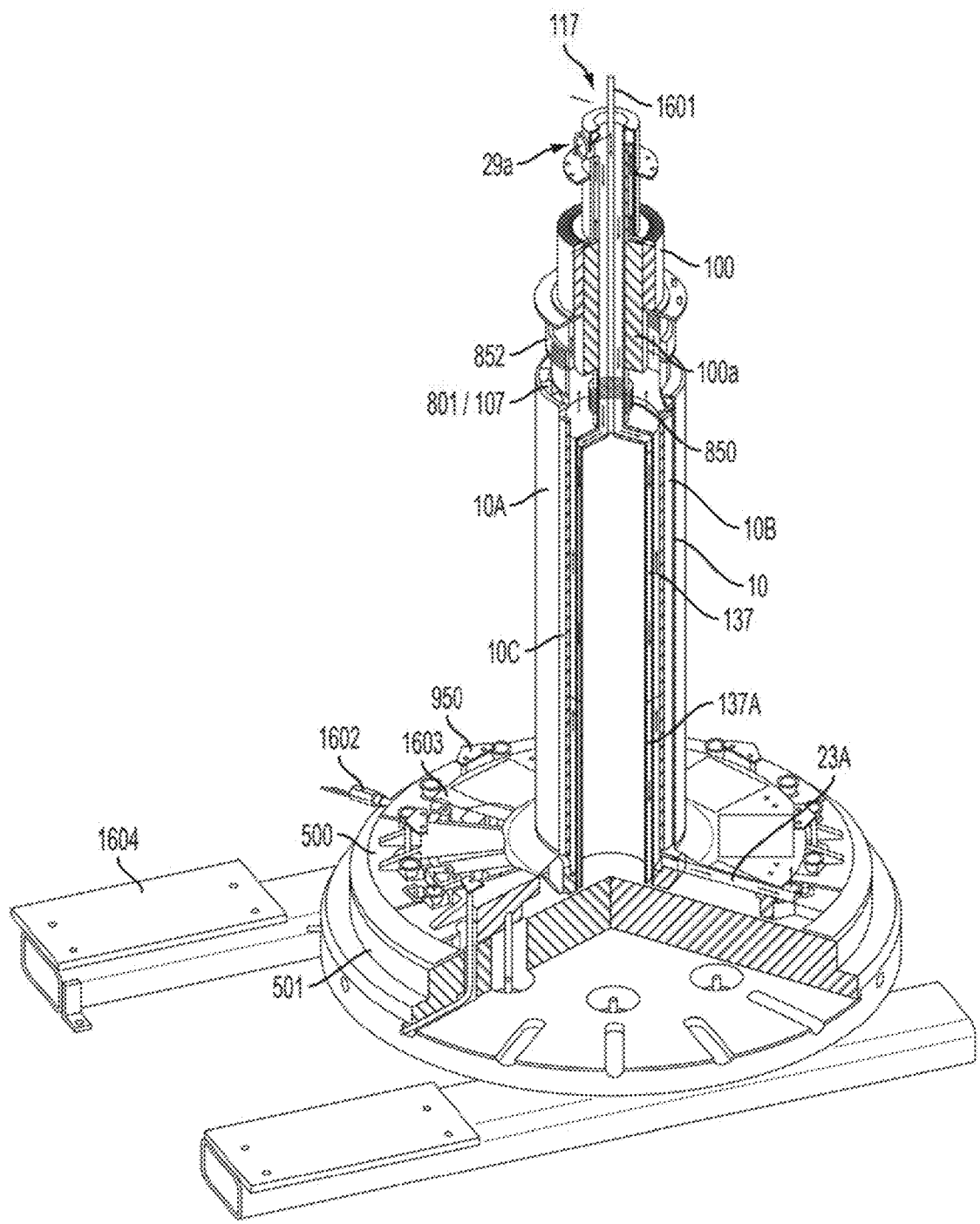
FIG. 16 is a three dimensional cut-away view of an anode flow structure according to an embodiment.

As discussed above, in the prior fuel cell systems, it is difficult to maintain a continuous mechanical load on the fuel cell column through the full range of thermal operating conditions. In another embodiment, the inventors have realized, however, that by including a bellows 206 on the vertical cylinders, the weight of the cylinders can rest directly on the columns. Thus, in another embodiment, as shown in FIGS. 12A and 13B, the uni-shell cathode recuperator 200 may contain an expansion bellows 206 on its outer or heat shield shell 204 located below the corrugated fin plate 304 for additional coefficient of thermal expansion (CTE) matching to that of the stack columns. Furthermore, as shown in FIG. 16, two additional bellows 850, 852 may be located in the anode inlet area and the anode tail-gas oxidizer (ATO) exhaust area near top of hot box for additional CTE matching.

The bellows 206 allows the cathode recuperator 200 cylinders (e.g., 204, 304) to remain in contact with the fuel cell stack 9 columns throughout the thermal operating conditions. The bellows 206 are designed to deform during operations such that the forces induced during temperature increases overcome the strength of the bellows, allowing the main contact point to remain at the top of the fuel cell columns.

Embodiments of the recuperator uni-shell may have one or more of the following advantages: improved sealing of air bypass at the top of the columns and continuous load on the columns. The continuous load on the columns gives some insurance that even with failure of the internal compression mechanism there would still be some (vertical) mechanical load on the columns. The use of the expansion bellows 206 within the uni-shell assembly allows for the shell assembly to expand and contract independently from the main anode flow structure of the system, thereby minimizing the thermo-mechanical effects of the two subassemblies.

Cathode Exhaust Steam Generator Structure

One embodiment of the invention provides steam generator having an increased duty over that of the prior art steam generator yet having the same physical envelope. Further, steam generator coils have local effects on the flow distribution which subsequently carry down into the cathode recuperator and affect the temperature distribution of the entire hot box. Thus, the embodiments of the cathode exhaust steam generator are configured allow control over the cathode exhaust stream flow distribution.

In embodiments of the present invention, the steam generator coil 310 is located in the lid section (e.g., between inner and outer lids 302A and 312) of the cathode recuperator 200 to be closer to the higher grade fuel cell stack air or cathode exhaust waste heat, as shown in FIGS. 12A, 12F, 12G and 14. Alternatively, the steam generator 103 may alternatively be located in the exit plenum (vertical portion) of the cathode recuperator 200.

Figure 14:
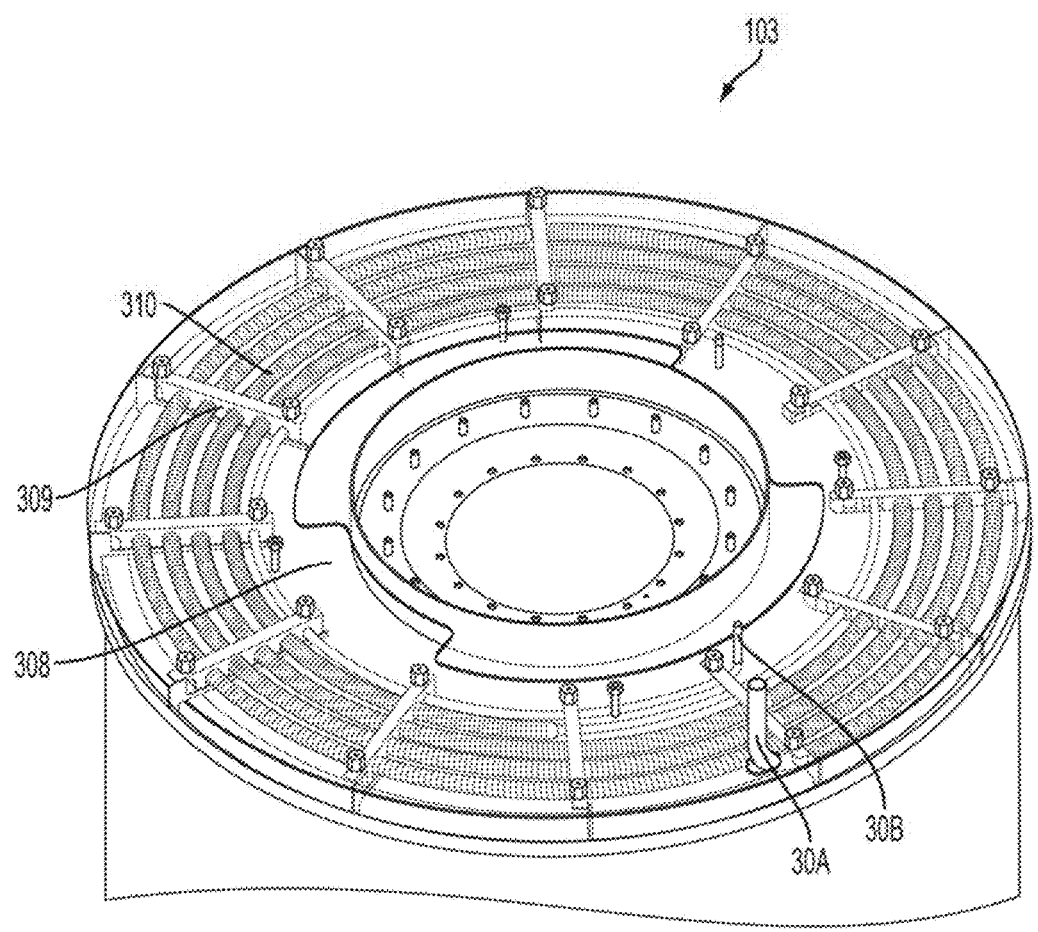
FIG. 14 is a sectional view of a cathode exhaust steam generator structure according to an embodiment.

The lid or exit plenum steam generator 103 location allows for a representative reduction in the coil length relative to the prior art. To counteract the effect of a varying pressure drop across the coiled sections, an exhaust baffle plate 308 may also be added to support the coil 310 (the baffle plate 308 and coil 310 are shown upside down in FIG. 14 compared to FIG. 12A for clarity). Support ribs 309 hold the coil 310 in place under the baffle plate 308. The steam coil 310 may be a partially or fully corrugated tube or a straight tube which has a smaller diameter near the water inlet conduit 30A than near the steam outlet conduit 30B. The steam coil 310 may have any suitable shape, such as a spiral coil, or one or more coils with one or more U-turns (i.e., a coil having at least two sections that are bent at an angle of 320-360 degrees with respect to each other). The U-turns for successive passes of the coil may be aligned or shifted with respect to teach other.

As shown in FIG. 12F, the baffle plate 308 forces the air exhaust stream 1227 travelling substantially vertically in an axial direction from the cathode recuperator 200 through conduit 119 to the steam generator 103 to make an additional pass around the coils 310 in the substantially horizontal, inward radial direction before exiting the hot box through outlet 35. The cathode exhaust stream travels through the steam generator 103 in a space between plate 302A and baffle plate 308 when the coils 310 are attached to the bottom of the baffle plate 308 and/or in a space between the baffle plate 308 and outer plate 312 when the coils 310 are attached to the top of the baffle plate 308. The additional pass provides for a uniform flow distribution across the surface of the corrugated steam coil 310 and within the cathode recuperator 200.

Embodiments of the steam generator 103 may have one or more of the following advantages: utilization of higher grade heat, more compact relative to the prior art, easy to manufacture, improved flow distribution.

Pre-Reformer Tube-Insert Catalyst

Figure 1:
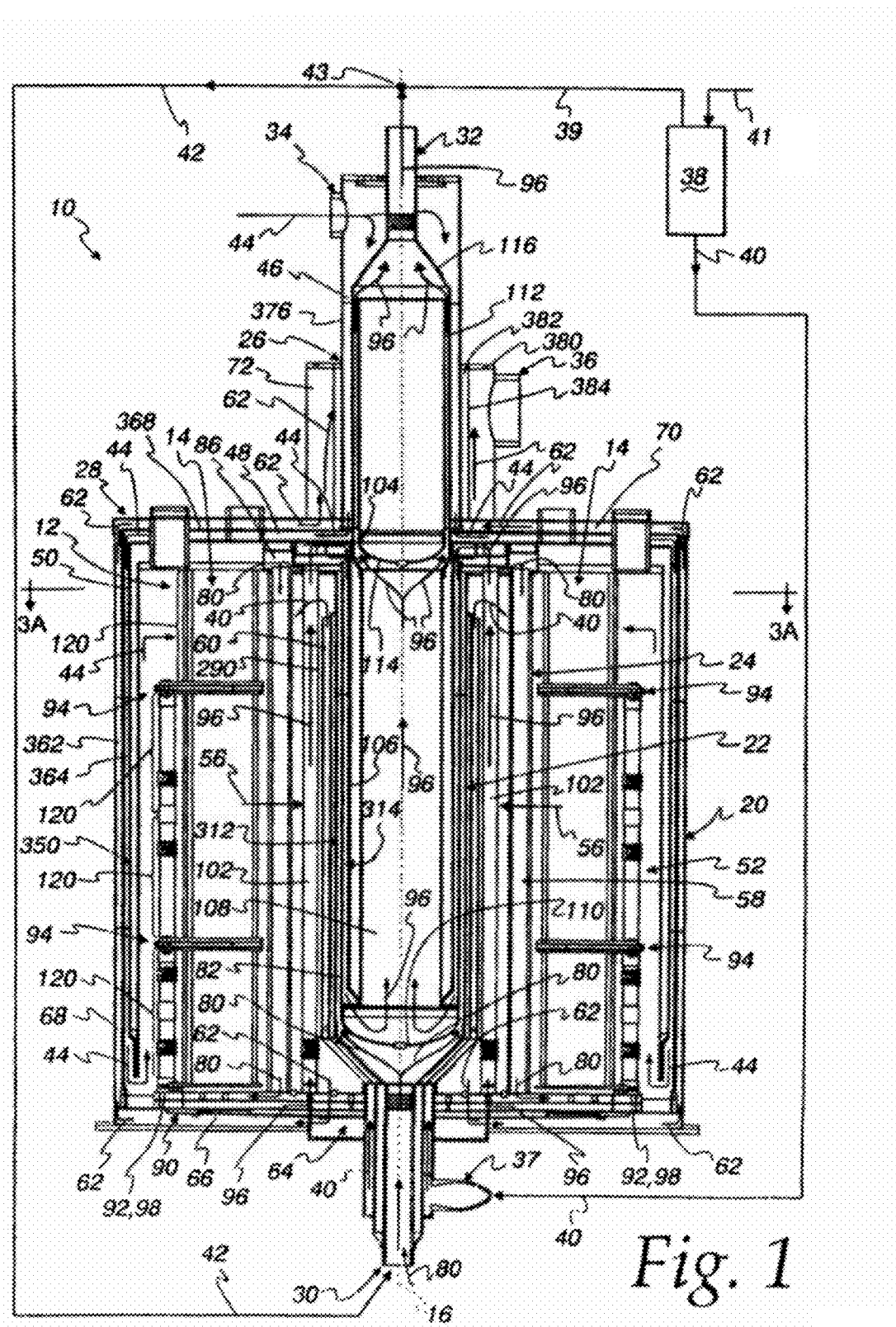
FIG. 1 is a sectional view of a prior art fuel cell unit with an integrated SOFC and fuel processor.
Figure 2A:
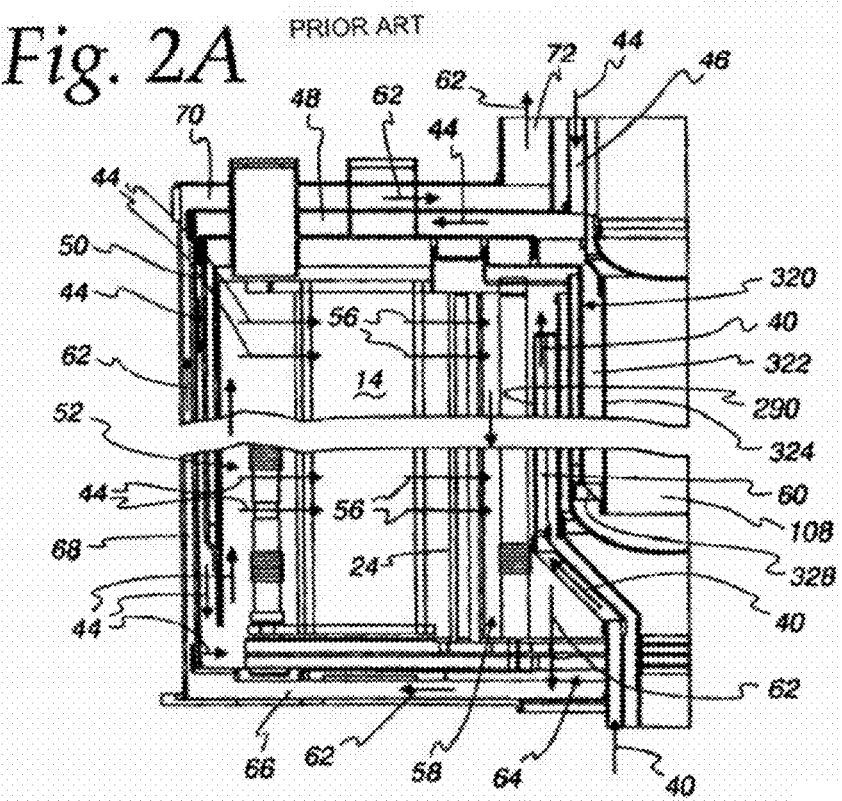
FIGS. 2A and 2B are sectional views showing one half of the prior art fuel cell unit of FIG. 1, with FIG. 2A illustrating the flows of the cathode feed and exhaust gases and FIG. 2B illustrating the flows of the anode feed and exhaust gases.
Figure 2B:
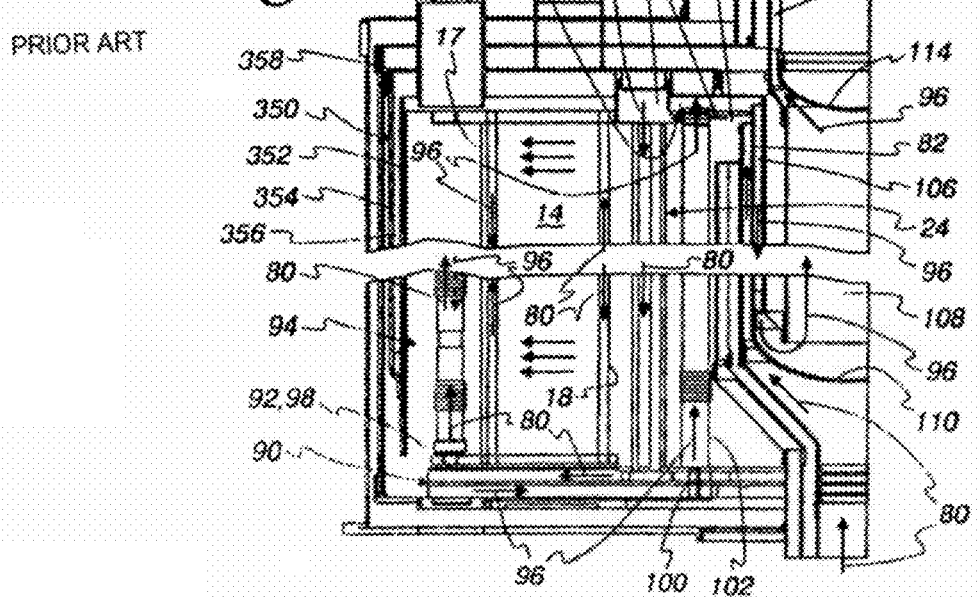
Figure 3B:
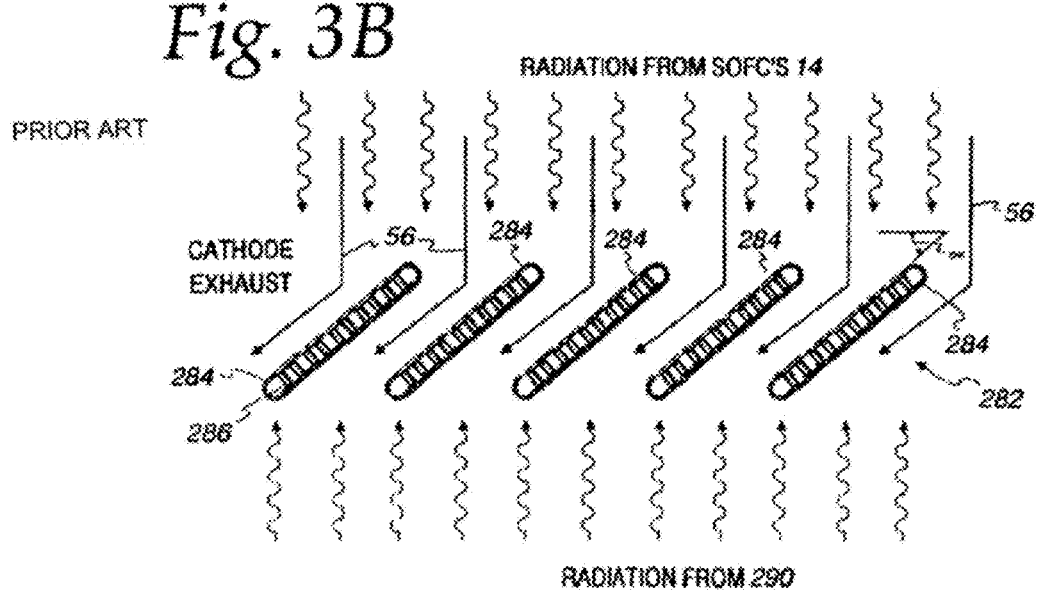
FIG. 3B is an enlarged, somewhat schematic view taken from line 3B-3B in FIG. 3A.
Figure 9:
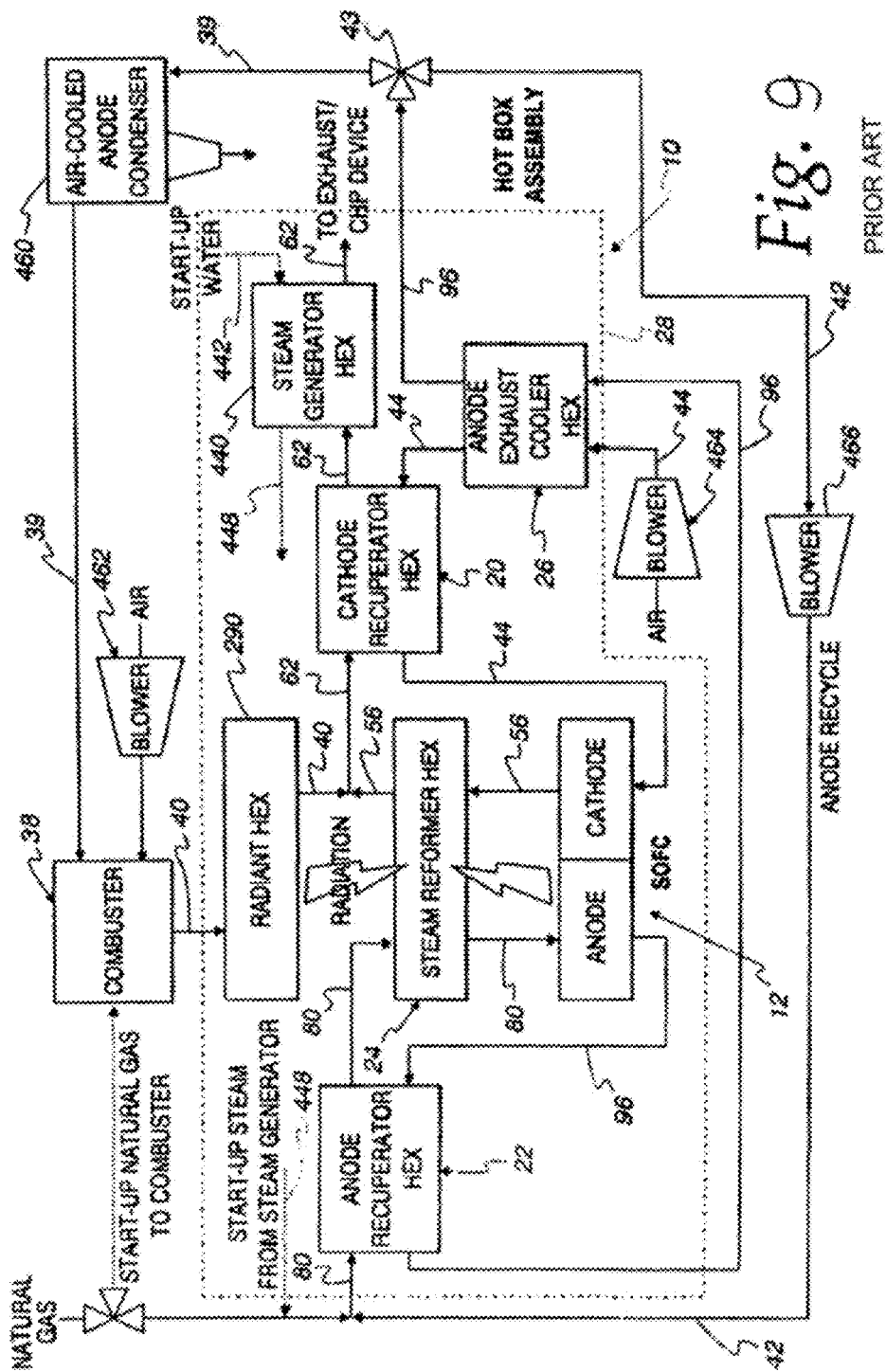
FIG. 9 is a schematic representation of the fuel cell unit if FIG. 1.

In prior art fuel cell systems, the level of pre-reformation of the fuel prior to hitting the fuel cell may need to be fine tuned depending on the source of the fuel and respective compositions. The prior art steam methane reformer (SMR) shown in FIGS. 1-3 includes a flat tube with flat catalyst coated inserts. In the prior at design, there is significant flow length available to accommodate a significant amount of catalyst should the need arise. In embodiments of the present invention, there is a limited amount of flow length available for catalyst placement. The limited amount of flow length reduces the overall flow path length of the fuel, thus reducing the pressure drop and mechanical design complexity needed to have multiple turn flow paths.

In one embodiment of the present invention, the reformer catalyst 137A is provided into the fuel inlet side of the anode recuperator (e.g., fuel heat exchanger) 137 in which the fuel exhaust stream is used to heat the fuel inlet stream. Thus, the anode recuperator is a combined heat exchanger/reformer. For a vertical/axial anode recuperator 137 shown in FIG. 15A, the SMR reformation catalyst (e.g., nickel and/or rhodium) 137A may be provided along the entire length of the fuel inlet side of the recuperator 137 or just in the lower portion of the fuel inlet side of the recuperator. It could also be comprised of a separate item following the exhaust of the heat exchanger. It is believed that the primary reformation occurs at the bottom of the fuel inlet side of the anode recuperator. Thus, the only heat provided to the fuel inlet stream in the catalyst 137A containing portion of the anode recuperator 137 to promote the SMR reaction is from the heat exchange with the fuel exhaust stream because the anode recuperator is thermally isolated from the ATO 10 and stacks 9 by the insulation 10B shown in FIGS. 15A, 16, 17B and 18B.

Figure 15A:
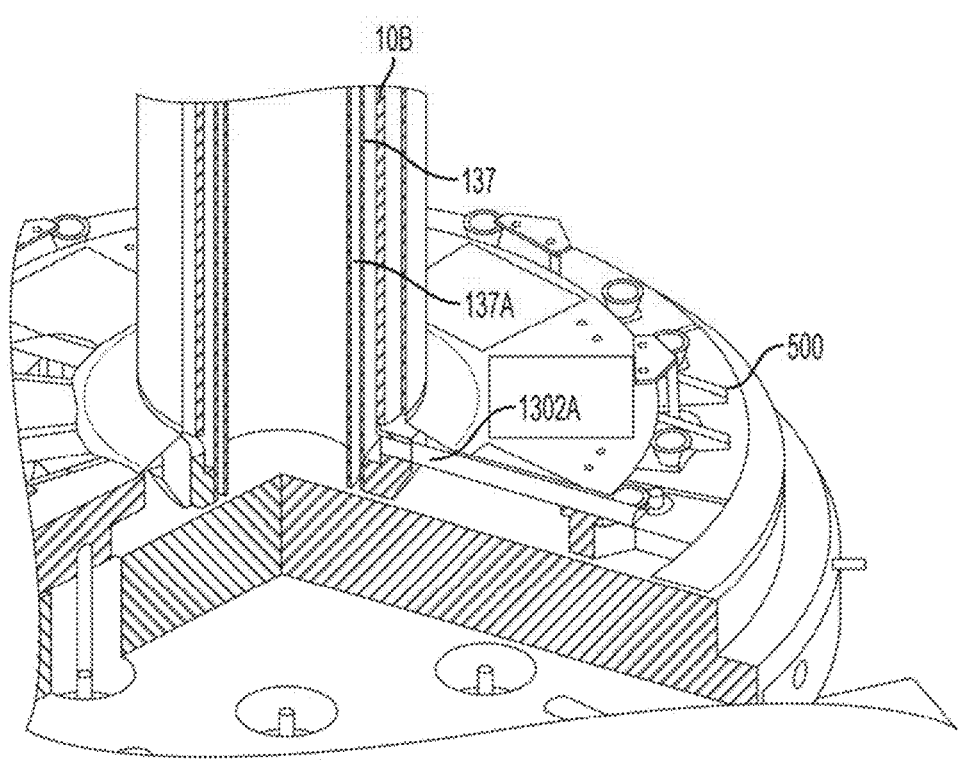
FIG. 15A is a three dimensional cut-away view of a vertical/axial anode recuperator according to an embodiment.
Figure 15B:
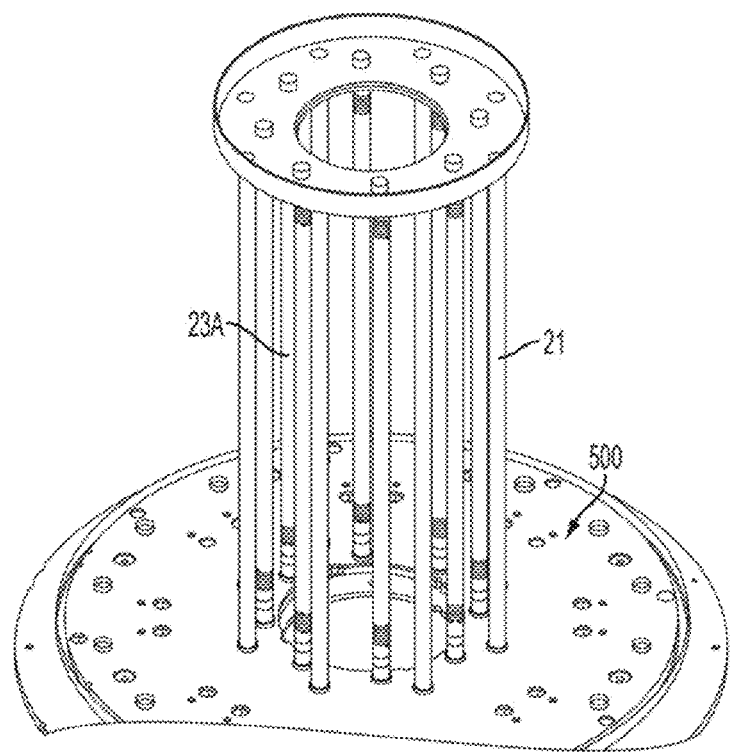
FIG. 15B is a sectional view illustrating fuel inlet and fuel outlet tubes located in a hot box base.

Should additional catalyst activity be desired, a catalyst coated insert can be inserted into the fuel feed conduits 21 just prior to the fuel cell stacks 9. The fuel feed conduits 21 comprise pipes or tubes which connect the output of the fuel inlet side of the anode recuperator 137 to the fuel inlet of the fuel cell stacks or columns 9. The conduits 21 may be positioned horizontally over the hot box base 500, as shown in FIG. 15A and/or vertically over the hot box base 500, as shown in FIG. 15B. This catalyst is a supplement or stand alone feature to the catalyst coated fin at the bottom of the anode recuperator 137. If desired, the catalyst may be placed in less than 100% of the fuel feed conduits (i.e., the catalyst may be placed in some but not all conduits 21 and/or the catalyst may be located in only a part of the length of each or some of the conduits). The placement of the SMR catalyst at the bottom of the hot box may also act as a temperature sink for the bottom modules.

Figure 15C:
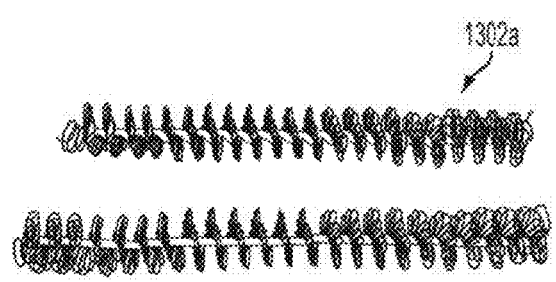
FIGS. 15C and 15D are three dimensional views of embodiments of catalyst coated inserts for the steam methane reformer.
Figure 15D:
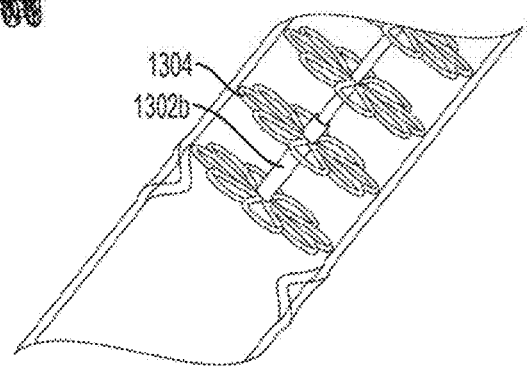

FIGS. 15C and 15D illustrate embodiments of catalyst coated inserts 1302a, 1302b that may be used as anode recuperator/pre-reformer 137 tube insert catalyst or as inserts in conduits 21. The catalyst coated insert 1302a has a generally spiral configuration. The catalyst coated insert 1302b includes a series of generally parallel wire rosettes 1304.

Embodiments of the pre-reformer tube-insert catalyst may have one or more of the following advantages: additional reformation length if desired and the ability to place endothermic coupling with the bottom module of the column should the bottom modules be hotter than desired.

Anode Flow Structure and Flow Hub

FIG. 16 illustrates the anode flow structure according to one embodiment of the invention. The anode flow structure includes a cylindrical anode recuperator (also referred to as a fuel heat exchanger)/pre-reformer 137, the above described anode cooler (also referred to as an air pre-heater) heat exchanger 100 mounted over the anode recuperator, and an anode tail gas oxidizer (ATO) 10.

The ATO 10 comprises an outer cylinder 10A which is positioned around the inner ATO insulation 10B/outer wall of the anode recuperator 137. Optionally, the insulation 10B may be enclosed by an inner ATO cylinder 10D, as shown in FIG. 18B. Thus, the insulation 10B is located between the outer anode recuperator cylinder and the inner ATO cylinder 10D. An oxidation catalyst 10C is located in the space between the outer cylinder 10A and the ATO insulation 10B (or inner ATO cylinder 10D if present). An ATO thermocouple feed through 1601 extends through the anode exhaust cooler heat exchanger 100 and the cathode recuperator 200 to the top of the ATO 10. The temperature of the ATO may thereby be monitored by inserting a thermocouple (not shown) through this feed through 1601.

An anode hub structure 600 is positioned under the anode recuperator 137 and ATO 10 and over the hot box base 500. The anode hub structure is covered by an ATO skirt 1603. A combined ATO mixer 801/fuel exhaust splitter 107 is located over the anode recuperator 137 and ATO 10 and below the anode cooler 100. An ATO glow plug 1602, which aids the oxidation of the stack fuel exhaust in the ATO, may be located near the bottom of the ATO. Also illustrated in FIG. 16 is a lift base 1604 which is located under the fuel cell unit. In an embodiment, the lift base 1604 includes two hollow arms with which the forks of a fork truck can be inserted to lift and move the fuel cell unit, such as to remove the fuel cell unit from a cabinet (not shown) for repair or servicing.

FIG. 17A illustrates an anode flow hub structure 600 according to an embodiment. The hub structure 600 is used to distribute fuel evenly from a central plenum to plural fuel cell stacks or columns. The anode flow hub structure 600 includes a grooved cast base 602 and a "spider" hub of fuel inlet pipes 21 and outlet pipes 23A. Each pair of pipes 21, 23A connects to one of the plurality of stacks or columns. Anode side cylinders (e.g., anode recuperator 137 inner and outer cylinders and ATO outer cylinder 10A) are then welded or brazed into the grooves in the base 602 creating a uniform volume cross section for flow distribution, as shown in FIGS. 17B, 17C and 18, respectively. The "spider" fuel tubes 21, 23A run from the anode flow hub 600 out to the stacks where they are welded to vertical fuel rails (see e.g., element 94 in FIG. 1). The anode flow hub 600 may be created by investment casting and machining and is greatly simplified over the prior art process of brazing large diameter plates.

As shown in FIGS. 17B and 17C (side cross sectional views) and 17D (top cross sectional view) the anode recuperator 137 includes an inner cylinder 139, a corrugated finger plate or cylinder 137B and an outer cylinder 137C coated with the ATO insulation 10B. FIG. 17B shows the fuel inlet flow 1729 from fuel inlet conduit 29 which bypasses the anode cooler 100 through its hollow core, then between the cylinders 139 and 137B in the anode recuperator 137 and then to the stacks or columns 9 (flow 1721) (shown also in FIG. 20) through the hub base 602 and conduits 21. FIG. 17C shows the fuel exhaust flow 1723A from the stacks or columns 9 through conduits 23A into the hub base 602, and from the hub base 602 through the anode recuperator 137 between cylinders 137B and 137C into the splitter 107. One part of the fuel exhaust flow stream from the splitter 107 flows through the above described anode cooler 100 while another part flows from the splitter 107 into the ATO 10. Anode cooler inner core insulation 100A may be located between the fuel inlet conduit 29 and the bellows 852/supporting cylinder 852A located between the anode cooler 100 and the ATO mixer 801, as shown in FIGS. 16, 17B and 17C. This insulation minimizes heat transfer and loss from the anode exhaust stream in conduit 31 on the way to the anode cooler 100. Insulation 100A may also be located between conduit 29 and the anode cooler 100 to avoid heat transfer between the fuel inlet stream in conduit 29 and the streams in the anode cooler 100. Furthermore, additional insulation may be located around the bellows 852/cylinder 852A (i.e., around the outside surface of bellows/cylinder) if desired.

FIG. 17C also shows the air inlet flow from conduit 33 through the anode cooler 100 (where it exchanges heat with the fuel exhaust stream) and into the cathode recuperator 200 described above.

Embodiments of the anode flow hub 600 may have one or more of the following advantages: lower cost manufacturing method, ability to use fuel tube in reformation process if required and reduced fixturing.

ATO Air Swirl Element

In another embodiment of the invention, the present inventors realized that in the prior art system shown in FIGS. 1-9, the azimuthal flow mixing could be improved to avoid flow streams concentrating hot zones or cold zones on one side of the hot box 1. Azimuthal flow as used herein includes flow in angular direction that curves away in a clockwise or counterclockwise direction from a straight line representing a radial direction from a center of a cylinder to an outer wall of the cylinder, and includes but is not limited to rotating, swirling or spiraling flow. The present embodiment of the invention provides a vane containing swirl element for introducing swirl to the air stream provided into the ATO 10 to promote more uniform operating conditions, such as temperature and composition of the fluid flows.

Figure 18A:
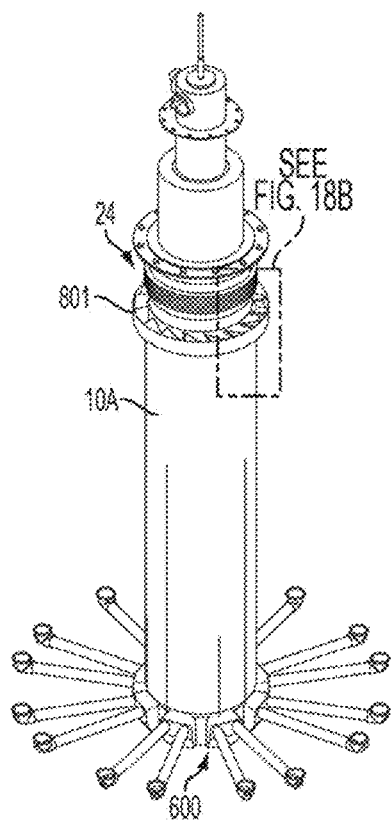
FIG. 18A is a three dimensional view of an anode tail gas oxidizer according to an embodiment.
Figure 18B:
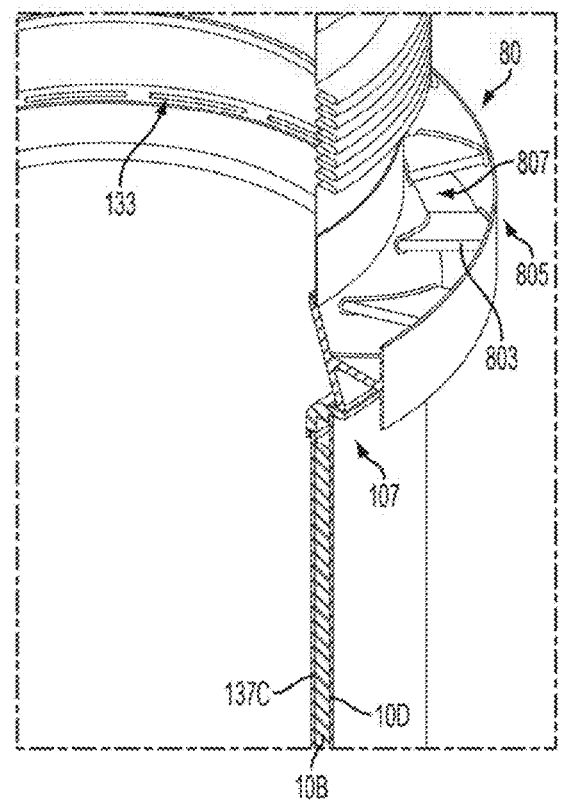
FIGS. 18B and 18C are three dimensional cut-away views of the anode tail gas oxidizer of FIG. 18A.
Figure 18C:
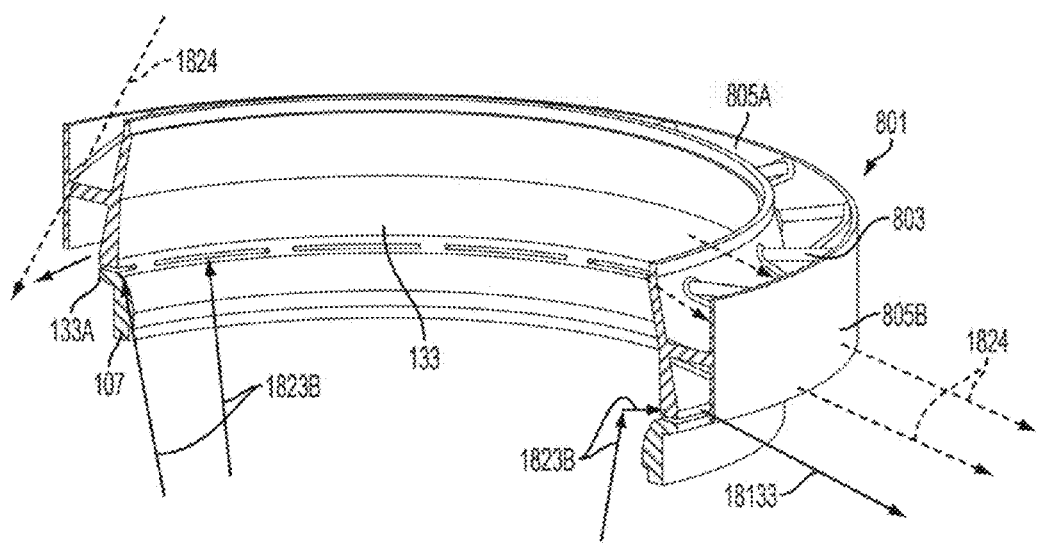

As shown in FIGS. 18A, 18B and 18C, one embodiment of an ATO mixer 801 comprises a turning vane assembly which moves the stack air exhaust stream heat azimuthally and/or radially across the ATO to reduce radial temperature gradients. The cylindrical mixer 801 is located above the ATO 10 and may extend outwardly past the outer ATO cylinder 10A. Preferably, the mixer 801 is integrated with the fuel exhaust splitter 107 as will be described in more detail below.

FIG. 18B is a close up, three dimensional, cut-away cross sectional view of the boxed portion of the ATO 10 and mixer 801 shown in FIG. 18A. FIG. 18C is a three dimensional, cut-away cross sectional view of the integrated ATO mixer 801/fuel exhaust splitter 107.

As shown in FIG. 18A, the turning vane assembly ATO mixer 801 may comprise two or more vanes 803 (which may also be referred to as deflectors or baffles) located inside an enclosure 805. The enclosure 805 is cylindrical and contains inner and outer surfaces 805A, 805B, respectively (as shown in FIG. 18C), but is generally open on top to receive the cathode exhaust flow from the stacks 9 via air exhaust conduit or manifold 24. The vanes 803 may be curved or they may be straight. A shape of turning vane 803 may curve in a golden ratio arc or in catenary curve shape in order to minimize pressure drop per rotation effect.

The vanes 803 are slanted (i.e., positioned diagonally) with respect to the vertical (i.e., axial) direction of the ATO cylinders 10A, 10D, at an angle of 10 to 80 degrees, such as 30 to 60 degrees, to direct the cathode exhaust 1824 in the azimuthal direction. At the base of each vane 803, an opening 807 into the ATO 10 (e.g., into the catalyst 10C containing space between ATO cylinders 10A and 10D) is provided. The openings 807 provide the cathode exhaust 1824 azimuthally from the assembly 801 into the ATO as shown in FIG. 18C. While the assembly 801 is referred to as turning vane assembly, it should be noted that the assembly 801 does not rotate or turn about its axis. The term "turning" refers to the turning of the cathode exhaust stream 1824 in the azimuthal direction.

The assembly 801 may comprise a cast metal assembly. Thus, the air exits the fuel cell stacks it is forced to flow downwards into the ATO mixer 801. The guide vanes 803 induce a swirl into the air exhaust stream 1824 and direct the air exhaust stream 1824 down into the ATO. The swirl causes an averaging of local hot and cold spots and limits the impact of these temperature maldistributions. Embodiments of the ATO air swirl element may improve temperature distribution which allows all stacks to operate at closer points, reduced thermal stress, reduced component distortion, and longer operating life.

ATO Fuel Mixer/Injector

Prior art systems include a separate external fuel inlet stream into the ATO. One embodiment of the present provides a fuel exhaust stream as the sole fuel input into the ATO. Thus, the separate external ATO fuel inlet stream can be eliminated.

As will be described in more detail below and as shown in FIGS. 17C and 18C, the fuel exhaust stream 1823B exiting the anode recuperator 137 through conduit 23B is provided into splitter 107. The splitter 107 is located between the fuel exhaust outlet conduit 23B of the anode recuperator 137 and the fuel exhaust inlet of the anode cooler 100 (e.g., the air pre-heater heat exchanger). The splitter 107 splits the fuel exhaust stream into two streams. The first stream 18133 is provided to the ATO 10. The second stream is provided via conduit 31 into the anode cooler 100.

The splitter 107 contains one or more slits or slots 133 shown in FIGS. 18B and 18C, to allow the splitter 107 functions as an ATO fuel injector. The splitter 107 injects the first fuel exhaust stream 18133 in the ATO 10 through the slits or slots 133. A lip 133A below the slits 133 and/or the direction of the slit(s) force the fuel into the middle of the air exhaust stream 1824 rather than allowing the fuel exhaust stream to flow along the ATO wall 10A or 10D. Mixing the fuel with the air stream in the middle of the flow channel between ATO walls 10A and 10D allows for the highest temperature zone to be located in the flow stream rather than on the adjacent walls. The second fuel exhaust stream which does not pass through the slits 133 continues to travel upward into conduit 31, as shown in FIG. 17C. The amount of fuel exhaust provided as the first fuel exhaust stream into the ATO through slits 133 versus as the second fuel exhaust stream into conduit 31 is controlled by the anode recycle blower 123 speed (see FIGS. 17C and 20). The higher the blower 123 speed, the larger portion of the fuel exhaust stream is provided into conduit 31 and a smaller portion of the fuel exhaust stream is provided into the ATO 10, and vice-versa.

Alternate embodiments of the ATO fuel injector include porous media, shower head type features, and slits ranging in size and geometry.

Preferably, as shown in FIG. 18C, the splitter 107 comprises an integral cast structure with the ATO mixer 801. The slits 133 of the splitter are located below the vanes 803 such that the air exhaust stream which is azimuthally rotated by the vanes while flowing downward into the ATO 10 provides a similar rotation to the first fuel exhaust stream passing through the slits 133 into air exhaust steam in the ATO. Alternatively, the splitter 107 may comprise a brazed on ring which forms the ATO injector slit 133 by being spaced apart from its supporting structure.

Cathode Exhaust Swirl Element

Figure 18D:
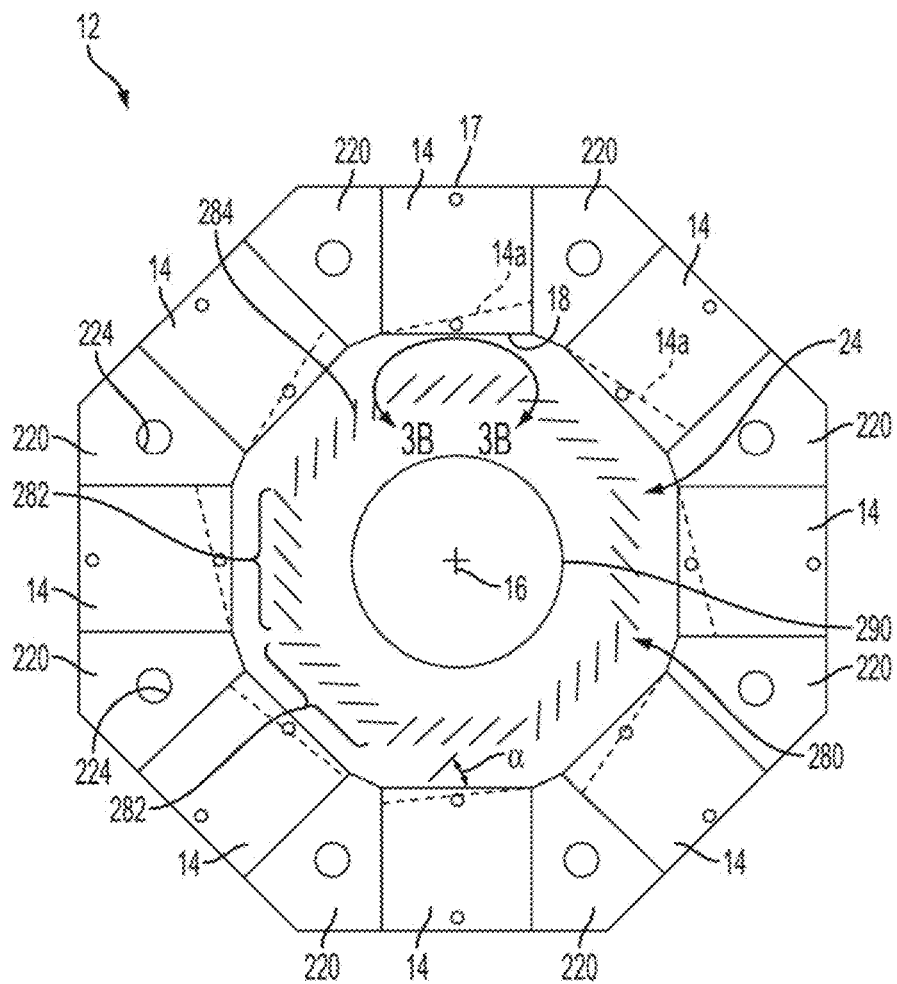
FIG. 18D is a schematic illustration of the top view of a fuel cell system showing a cathode exhaust swirl element according to an embodiment.

Stacks could also be rotated slightly on their axis such that the faces of the stacks which face the middle of the ring of stacks do not align radially, but are positioned with respect to each other at a slight, non-zero angle, such as 1 to 20 degrees for example. This may create a slight swirl to the cathode exhaust stream (i.e., air) leaving the stacks moving in towards the central axis of the hot box. The advantage of this swirl effect is the blending of cathode exhaust temperatures from column to column resulting in more uniform temperature distribution. FIG. 18D illustrates the top view of the fuel cell system of FIG. 3A where the stacks 14 are rotated such that the faces 14a of the stacks which face the middle of the ring of stacks of the stacks do not align radially. In other words, the faces 14a shown by dashed lines are not tangential to the circle which forms the interior of the ring of stacks 14, but deviate from the tangent by 1-20 degrees.

Stack Electrical Terminals and Insulation

The prior art system includes current collector rods that penetrate the anode base plate and the hot box base plates through several feedthroughs. Each feed through has a combination of ceramic and metallic seal elements. Multiple plate penetrations, however, require sealing of current collector rods at each plate to prevent leakage between inlet and exhaust air streams and overboard air leakage from the exhaust stream. Any leakage, however, reduces the overall efficiency of the hot box and may cause localized thermal imbalances.

Figure 19:
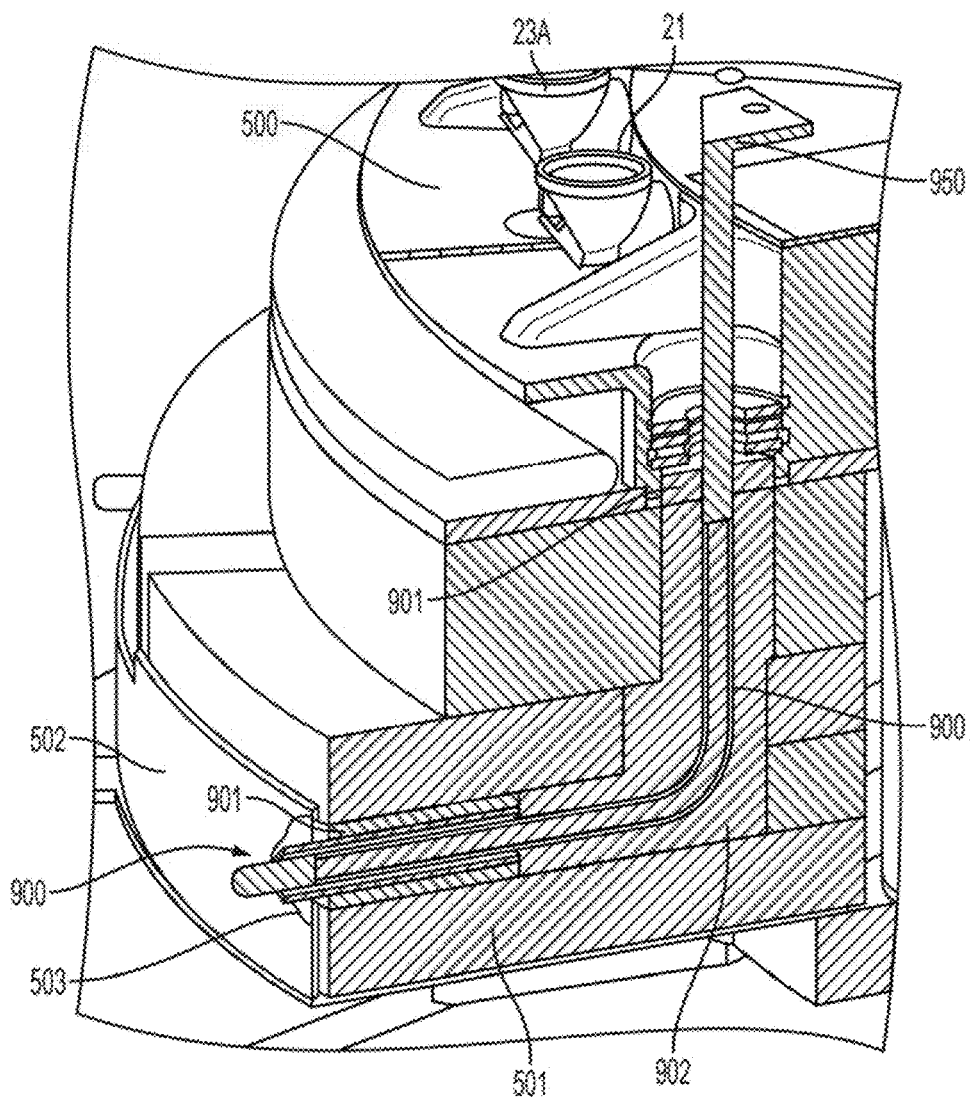
FIG. 19 is a three dimensional cut-away view illustrating the stack electrical connections and insulation according to an embodiment.

An embodiment of a simplified stack electrical terminal (e.g., current collector rod 950) is illustrated in FIGS. 16 and 19. In this embodiment, the stack support base 500 contains a bridging tube 900 which eliminates the need for one of the seal elements. The bridging tube 900 may be made of an electrically insulating material, such as a ceramic, or it may be made of a conductive material which is joined to a ceramic tube outside the base pan 502. The use of a bridging tube 900 eliminates the air in to air out leak path. The current collector/electrical terminal 950 is routed in the bridging tube 900 from top of the cast hot box base 500 through the base insulation 501 and out of the base pan 502. A sheet metal retainer 503 may be used to fix the tube 900 to the base pan 502.

The tube 900 may be insulated in the base with super wool 901 and/or a "free flow" insulation material 902. The "free flow" insulation 902 is a fluid that can be poured into an opening in the base 500 around the tube 900 but solidifies into a high temperature resistant material when cured.

Embodiments of the simplified stack electrical terminals may have one or more of the following advantages: elimination of the cross over leak risk and reduced cost due to elimination of repeat sealing elements and improved system efficiency by reduced air losses.

In an alternative embodiment, the ATO insulation 10B and the anode cooler inner core insulation 100A (shown in FIG. 16A) may also comprise the free flow insulation. Furthermore, an outer cylinder 330 may be constructed around the outer shell of the hot box as shown in FIG. 12A. The gap between outer cylinder 330 and the outer shell of the hot box may then be filled with the free flow insulation. The outer shell of the hot box forms the inner containment surface for the free flow insulation.

Process Flow Diagram

Figure 20:
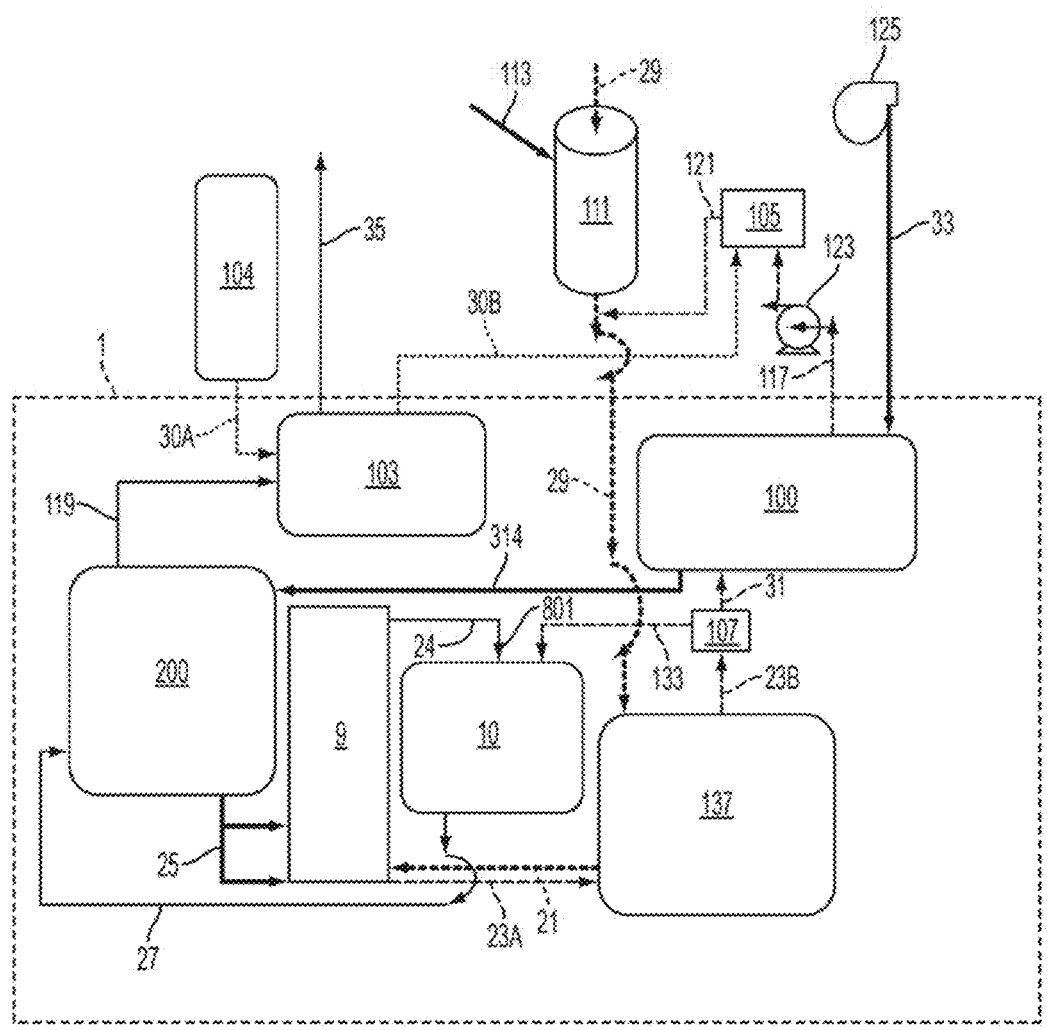
FIG. 20 is a schematic process flow diagram illustrating a hot box according to an embodiment.

FIG. 20 is a schematic process flow diagram representation of the hot box 1 components showing the various flows through the components according to another embodiment of the invention. The components in this embodiment may have the configuration described in the prior embodiments or a different suitable configuration. In this embodiment, there are no fuel and air inputs to the ATO 10.

Thus, in contrast to the prior art system, external natural gas or another external fuel is not fed to the ATO 10. Instead, the hot fuel (anode) exhaust stream from the fuel cell stack(s) 9 is partially recycled into the ATO as the ATO fuel inlet stream. Likewise, there is no outside air input into the ATO. Instead, the hot air (cathode) exhaust stream from the fuel cell stack(s) 9 is provided into the ATO as the ATO air inlet stream.

Furthermore, the fuel exhaust stream is split in a splitter 107 located in the hot box 1. The splitter 107 is located between the fuel exhaust outlet of the anode recuperator (e.g., fuel heat exchanger) 137 and the fuel exhaust inlet of the anode cooler 100 (e.g., the air pre-heater heat exchanger). Thus, the fuel exhaust stream is split between the mixer 105 and the ATO 10 prior to entering the anode cooler 100. This allows higher temperature fuel exhaust stream to be provided into the ATO than in the prior art because the fuel exhaust stream has not yet exchanged heat with the air inlet stream in the anode cooler 100. For example, the fuel exhaust stream provided into the ATO 10 from the splitter 107 may have a temperature of above 350 C, such as 350-500 C, for example 375 to 425 C, such as 390-410 C. Furthermore, since a smaller amount of fuel exhaust is provided into the anode cooler 100 (e.g., not 100% of the anode exhaust is provided into the anode cooler due to the splitting of the anode exhaust in splitter 107), the heat exchange area of the anode cooler 100 described above may be reduced.

The splitting of the anode exhaust in the hot box prior to the anode cooler has the following benefits: reduced cost due to the smaller heat exchange area for the anode exhaust cooler, increased efficiency due to reduced anode recycle blower 123 power, and reduced mechanical complexity in the hot box due to fewer fluid passes.

The benefits of eliminating the external ATO air include reduced cost since a separate ATO fuel blower is not required, increased efficiency because no extra fuel consumption during steady state or ramp to steady state is required, simplified fuel entry on top of the hot box next to anode gas recycle components, and reduced harmful emissions from the system because methane is relatively difficult to oxidize in the ATO. If external methane/natural gas is not added to the ATO, then it cannot slip.

The benefits of eliminating the external ATO fuel include reduced cost because a separate ATO air blower is not required and less ATO catalyst/catalyst support is required due to higher average temperature of the anode and cathode exhaust streams compared to fresh external fuel and air streams, a reduced cathode side pressure drop due to lower cathode exhaust flows, increased efficiency due to elimination of the power required to drive the ATO air blower and reduced main air blower 125 power due to lower cathode side pressure drop, reduced harmful emissions since the ATO operates with much more excess air, and potentially more stable ATO operation because the ATO is always hot enough for fuel oxidation after start-up.

The hot box 1 contains the plurality of the fuel cell stacks 9, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 9 may be arranged over each other in a plurality of columns as shown in FIG. 13A.

The hot box 1 also contains a steam generator 103. The steam generator 103 is provided with water through conduit 30A from a water source 104, such as a water tank or a water pipe (i.e., a continuous water supply), and converts the water to steam. The steam is provided from generator 103 to mixer 105 through conduit 30B and is mixed with the stack anode (fuel) recycle stream in the mixer 105. The mixer 105 may be located inside or outside the hot box of the hot box 1. Preferably, the humidified anode exhaust stream is combined with the fuel inlet stream in the fuel inlet line or conduit 29 downstream of the mixer 105, as schematically shown in FIG. 20. Alternatively, if desired, the fuel inlet stream may also be provided directly into the mixer 105, or the steam may be provided directly into the fuel inlet stream and/or the anode exhaust stream may be provided directly into the fuel inlet stream followed by humidification of the combined fuel streams.

The steam generator 103 is heated by the hot ATO 10 exhaust stream which is passed in heat exchange relationship in conduit 119 with the steam generator 103, as shown in FIG. 12F.

The system operates as follows. The fuel inlet stream, such as a hydrocarbon stream, for example natural gas, is provided into the fuel inlet conduit 29 and through a catalytic partial pressure oxidation (CPOx) 111 located outside the hot box. During system start up, air is also provided into the CPOx reactor 111 through CPOx air inlet conduit 113 to catalytically partially oxidize the fuel inlet stream. During steady state system operation, the air flow is turned off and the CPOx reactor acts as a fuel passage way in which the fuel is not partially oxidized. Thus, the hot box 1 may comprise only one fuel inlet conduit which provides fuel in both start-up and steady state modes through the CPOx reactor 111. Therefore a separate fuel inlet conduit which bypasses the CPOx reactor during steady state operation is not required.

The fuel inlet stream is provided into the fuel heat exchanger (anode recuperator)/pre-reformer 137 where its temperature is raised by heat exchange with the stack 9 anode (fuel) exhaust streams. The fuel inlet stream is pre-reformed in the pre-reformer section of the heat exchanger 137 (e.g., as shown in FIG. 15A) via the SMR reaction and the reformed fuel inlet stream (which includes hydrogen, carbon monoxide, water vapor and unreformed methane) is provided into the stacks 9 through the fuel inlet conduit(s) 21. As described above with respect to FIGS. 15A and 15B, additional reformation catalyst may be located in conduit(s) 21. The fuel inlet stream travels upwards through the stacks through fuel inlet risers in the stacks 9 and is oxidized in the stacks 9 during electricity generation. The oxidized fuel (i.e., the anode or fuel exhaust stream) travels down the stacks 9 through the fuel exhaust risers and is then exhausted from the stacks through the fuel exhaust conduits 23A into the fuel heat exchanger 137.

In the fuel heat exchanger 137, the anode exhaust stream heats the fuel inlet stream via heat exchange. The anode exhaust stream is then provided via the fuel exhaust conduit 23B into a splitter 107. A first portion of the anode exhaust stream is provided from the splitter 107 the ATO 10 via conduit (e.g., slits) 133.

A second portion of the anode exhaust stream is recycled from the splitter 107 into the anode cooler 100 and then into the fuel inlet stream. For example, the second portion of the anode exhaust stream is recycled through conduit 31 into the anode cooler (i.e., air pre-heater heat exchanger) where the anode exhaust stream pre-heats the air inlet stream from conduit 33. The anode exhaust stream is then provided by the anode recycle blower 123 into the mixer 105. The anode exhaust stream is humidified in the mixer 105 by mixing with the steam provided from the steam generator 103. The humidified anode exhaust stream is then provided from the mixer 105 via humidified anode exhaust stream conduit 121 into the fuel inlet conduit 29 where it mixes with the fuel inlet stream.

The air inlet stream is provided by a main air blower 125 from the air inlet conduit 33 into the anode cooler heat exchanger 100. The blower 125 may comprise the single air flow controller for the entire system, as described above. In the anode cooler heat exchanger 100, the air inlet stream is heated by the anode exhaust stream via heat exchange. The heated air inlet stream is then provided into the air heat exchanger (cathode recuperator 200) via conduit 314 as shown in FIGS. 12F and 20. The heated air inlet stream is provided from heat exchanger 200 into the stack(s) 9 via the air inlet conduit and/or manifold 25.

The air passes through the stacks 9 into the cathode exhaust conduit 24 and through conduit 24 and mixer 801 into the ATO 10. In the ATO 10, the air exhaust stream oxidizes the split first portion of the anode exhaust stream from conduit 133 to generate an ATO exhaust stream. The ATO exhaust stream is exhausted through the ATO exhaust conduit 27 into the air heat exchanger 200. The ATO exhaust stream heats air inlet stream in the air heat exchanger 200 via heat exchange. The ATO exhaust stream (which is still above room temperature) is then provided from the air heat exchanger 200 to the steam generator 103 via conduit 119. The heat from the ATO exhaust stream is used to convert the water into steam via heat exchange in the steam generator 103, as shown in FIG. 12F. The ATO exhaust stream is then removed from the system via the exhaust conduit 35. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 33 by blower 125 can be used to control the temperature of the stacks 9 and the ATO 10.

Thus, as described above, by varying the main air flow in conduit 33 using a variable speed blower 125 and/or a control valve to maintain the stack 9 temperature and/or ATO 10 temperature. In this case, the main air flow rate control via blower 125 or valve acts as a main system temperature controller. Furthermore, the ATO 10 temperature may be controlled by varying the fuel utilization (e.g., ratio of current generated by the stack(s) 9 to fuel inlet flow provided to the stack(s) 9). Finally the anode recycle flow in conduits 31 and 117 may be controlled by a variable speed anode recycle blower 123 and/or a control valve to control the split between the anode exhaust to the ATO 10 and anode exhaust for anode recycle into the mixer 105 and the fuel inlet conduit 29.

Any one or more features of any embodiment may be used in any combination with any one or more other features of one or more other embodiments. The construction and arrangements of the fuel cell system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

The invention claimed is:
1. A fuel cell system comprising:
a hot box; and
a fuel cell stack, an anode tail gas oxidizer (ATO), an anode exhaust stream splitter, and an anode cooler heat exchanger located in the hot box;
wherein the splitter is configured to provide a first portion of a fuel cell stack anode exhaust stream into the ATO while allowing a remainder of the anode exhaust stream to pass through the splitter into the anode cooler without being provided into the ATO.

2. The fuel cell system of claim 1, further comprising an anode recuperator heat exchanger and a cathode recuperator heat exchanger in the same hot box as the anode exhaust stream splitter.

3. The fuel cell system of claim 2, wherein the anode recupertor heat exchanger includes a fuel reformation catalyst such that the anode recuperator heat exchanger functions as both a heat exchanger and a per-reformer.

4. The fuel cell system of claim 3, further comprising a steam generator in the same hot box as the anode exhaust stream splitter.

5. The fuel cell system of claim 4, further comprising an anode recycle blower and a mixer located outside of the hot box.

6. The fuel cell system of claim 5, wherein:
an output of the anode cooler heat exchanger is connected to the anode recycle blower;
an output of the anode recycle blower is connected to the mixer;
an output of the steam generator is connected to the mixer to mix a second portion of the anode exhaust stream with steam.

7. The fuel cell system of claim 5, wherein:
an anode exhaust stream from the fuel cell stack is provided into the anode recuperator heat exchanger to heat a fuel inlet stream before the fuel inlet stream reaches the fuel cell stack;
the anode exhaust stream from the anode recuperator heat exchanger is provided into the anode exhaust stream splitter; and
the air inlet stream from the anode cooler is provided into the cathode recuperator heat exchanger to heat the air inlet steam using an ATO exhaust stream before the air inlet stream reaches the fuel cell stack.

8. The fuel cell system of claim 6, wherein the ATO, the anode recuperator heat exchanger and the cathode recuperator heat exchanger are located in the same hot box as the splitter, the solid oxide fuel cell stack and the anode cooler heat exchanger.

* * * * *